(12) United States Patent
Yu

(10) Patent No.: US 7,092,992 B1
(45) Date of Patent: Aug. 15, 2006

(54) WEB PAGE FILTERING INCLUDING SUBSTITUTION OF USER-ENTERED EMAIL ADDRESS

(75) Inventor: Tonny Yu, Hillsborough, CA (US)

(73) Assignee: Mailshell.com, Inc., Santa Clara, CA (US)

( * ) Notice: Subject to any disclaimer, the term of this patent is extended or adjusted under 35 U.S.C. 154(b) by 963 days.

(21) Appl. No.: 09/776,034

(22) Filed: Feb. 1, 2001

(51) Int. Cl.
*G06F 13/00* (2006.01)

(52) U.S. Cl. .................................................. 709/206

(58) Field of Classification Search ................ 709/204, 709/206, 207, 220, 223, 229
See application file for complete search history.

(56) References Cited

U.S. PATENT DOCUMENTS

| | | | |
|---|---|---|---|
| 5,694,616 A | 12/1997 | Johnson et al. | |
| 5,742,769 A | 4/1998 | Lee et al. | |
| 5,781,857 A | 7/1998 | Hwang et al. | |
| 5,822,526 A | 10/1998 | Waskiewicz | |
| 5,878,230 A | 3/1999 | Weber et al. | |
| 5,978,799 A | 11/1999 | Hirsch | |
| 5,987,609 A | 11/1999 | Hasebe | |
| 5,999,967 A | 12/1999 | Sundsted | |
| 6,023,723 A | 2/2000 | McCormick et al. | |
| 6,052,709 A | 4/2000 | Paul | |
| 6,104,500 A | 8/2000 | Alam et al. | |
| 6,108,688 A | 8/2000 | Nielsen | |
| 6,108,691 A | 8/2000 | Lee et al. | |
| 6,118,856 A | 9/2000 | Paarsmarkt et al. | |
| 6,141,695 A | 10/2000 | Sekiguchi et al. | |
| 6,161,130 A | 12/2000 | Horvitz et al. | |
| 6,223,213 B1 | 4/2001 | Cleron et al. | |
| 6,249,807 B1 | 6/2001 | Shaw et al. | |
| 6,272,532 B1 | 8/2001 | Feinleib | |
| 6,282,565 B1 | 8/2001 | Shaw et al. | |
| 6,289,214 B1 | 9/2001 | Backstrom | |
| 6,304,898 B1 | 10/2001 | Shiigi | |
| 6,321,267 B1 | 11/2001 | Donaldson | |
| 6,324,569 B1 | 11/2001 | Ogilvie et al. | |
| 6,330,589 B1 | 12/2001 | Kennedy | |
| 6,330,590 B1 | 12/2001 | Cotten | |
| 6,351,523 B1 | 2/2002 | Detlef | |
| 6,363,414 B1 | 3/2002 | Nicholls et al. | |
| 6,374,292 B1 | 4/2002 | Srivastava et al. | |
| 6,401,112 B1 | 6/2002 | Boyer et al. | |
| 6,405,225 B1 | 6/2002 | Apfel et al. | |
| 6,405,243 B1 | 6/2002 | Nielsen | |
| 6,413,000 B1 | 7/2002 | Borcherds et al. | |
| 6,424,426 B1 | 7/2002 | Henry | |

(Continued)

*Primary Examiner*—Robert B. Harrell
(74) *Attorney, Agent, or Firm*—Charles J. Kulas; Trellis Intellectual Property Law Group, PC

(57) ABSTRACT

A method and apparatus for using an intermediary to manage unwanted electronic messages is provided. The intermediary generates a unique address for each pairing of a user and an e-mail resource, such as a mail list. The intermediary maintains a database that identifies which user and which e-mail resource is associated with each unique address. When the intermediary receives messages, the intermediary identifies the user and the e-mail resource based on the database. The intermediary sorts messages for each user based on groups that are associated with each e-mail resource. The intermediary filters the messages to identify messages that are unwanted by the user, such as mass unsolicited e-mail. The intermediary identifies unwanted messages by comparing the sending address for each message to a list of authorized sending addresses for the e-mail resource, and by analyzing the content of the messages, such as identifying whether the messages contain hidden images.

14 Claims, 18 Drawing Sheets

U.S. PATENT DOCUMENTS

| | | |
|---|---|---|
| 6,438,584 B1 | 8/2002 | Powers |
| 6,443,841 B1 | 9/2002 | Rossides |
| 6,446,115 B1 | 9/2002 | Powers |
| 6,446,261 B1 | 9/2002 | Rosser |
| 6,460,075 B1 | 10/2002 | Krueger et al. |
| 6,473,812 B1 | 10/2002 | Motoyama |
| 6,487,586 B1 | 11/2002 | Ogilvie et al. |
| 6,502,127 B1 | 12/2002 | Edwards et al. |
| 6,522,421 B1 | 2/2003 | Chapman et al. |
| 6,526,042 B1 | 2/2003 | Pinard et al. |
| 6,529,908 B1 | 3/2003 | Piett et al. |
| 6,539,385 B1 | 3/2003 | Pollack et al. |
| 6,546,417 B1 | 4/2003 | Baker |
| 6,580,787 B1 | 6/2003 | Akhteruzzaman et al. |
| 6,587,871 B1 | 7/2003 | Schrader |
| 6,591,296 B1 | 7/2003 | Ghanime |
| 6,592,627 B1 | 7/2003 | Agrawal et al. |
| 6,600,750 B1 | 7/2003 | Joffe et al. |
| 6,614,551 B1 | 9/2003 | Peek |
| 6,615,241 B1 | 9/2003 | Miller et al. |
| 6,643,687 B1 | 11/2003 | Dickie et al. |
| 6,651,879 B1 | 11/2003 | Lapstun et al. |
| 6,654,787 B1 | 11/2003 | Aronson et al. |
| 6,671,718 B1 | 12/2003 | Meister et al. |
| 6,684,088 B1 | 1/2004 | Halahmi |
| 6,684,238 B1 | 1/2004 | Dutta |
| 6,732,157 B1 | 5/2004 | Gordon et al. |
| 6,836,792 B1 * | 12/2004 | Chen .......................... 709/220 |

* cited by examiner

FIG. 4

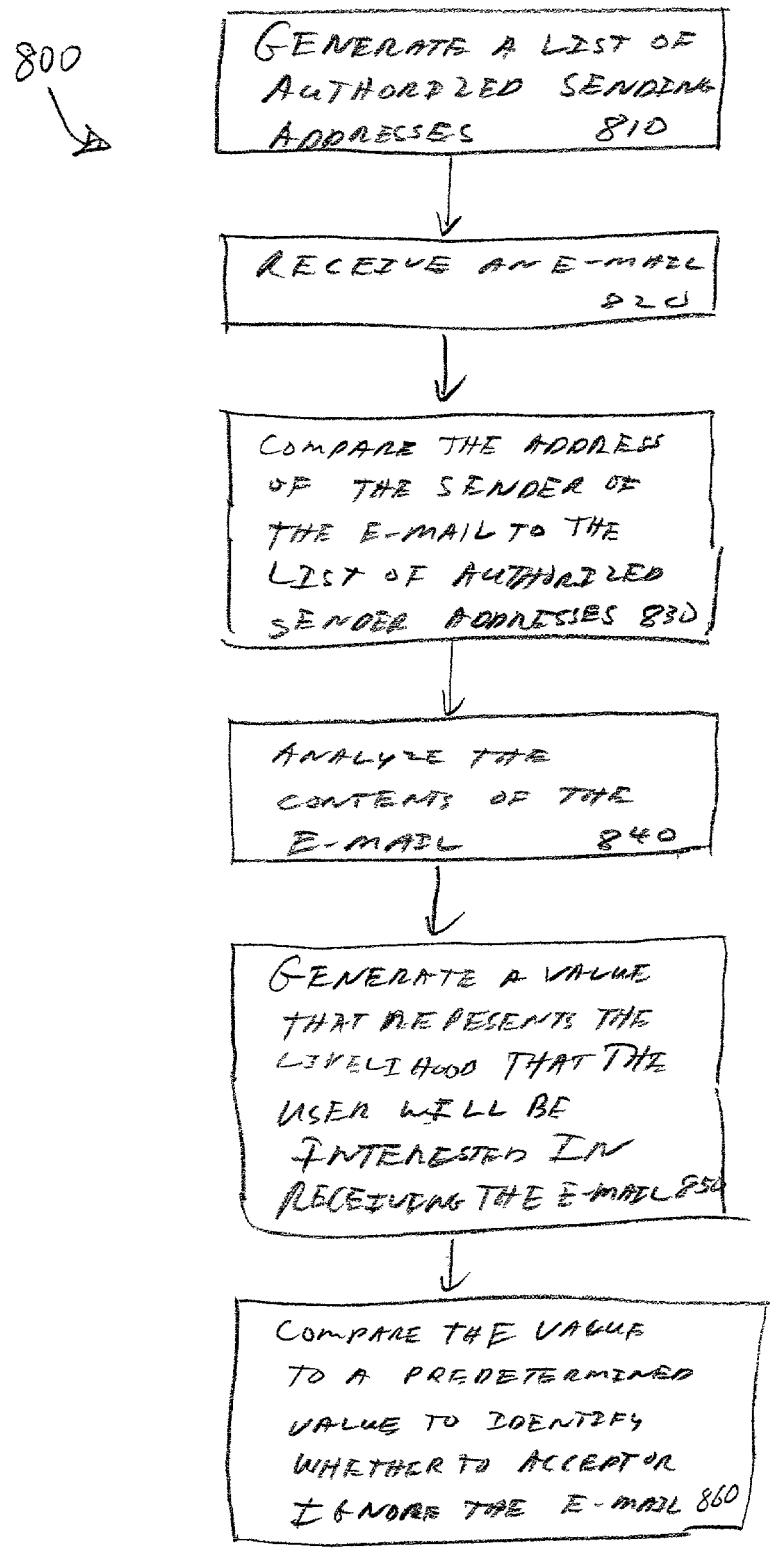

Quick Guides
- Special Offers
- Tips
- News
- Reminders
- Facts
- Fun with email
- Web Services
- Discussion List
- Privacy more guides...

Top Picks womencom — learn more

ARIAMAX — learn more

TIPWORLD — learn more more picks...

About List: FunnyGreetings.com - FunPages Newsletter  |subscribe|

Want to send your friends a good luck page? How about a silly greeting to lighten their day? FunnyGreetings.com specializes in entertaining webpages that you can send to friends. This newsletter sends you the new webpage greetings that have been added to the site.

- Pick Rating: ★★★★☆
- Popularity Rank: (540 / 3777)
- Date Added: *month, day, year*
- Language: English
- Maturity Level: all audiences

- Frequency: daily (1 per day)
- Average Size of Email: 4k
- Mailshell Subscription Size: 3
- Overall Subscription Size: NA
- announcements

→ 910

About Author: FunnyGreetings.com  |subscribe|

FunnyGreetings

- Home Page: FunnyGreetings.com
- Description from author: Send your friends a smile or a laugh with FunnyGreetings.com! Their Animated FunPages are their most popular cards, including Animated Musical FunPages, Dancing FunPages, Virtual Kisses, Animated Stories and Smiley Pages!
- Subscribe Direct: http://www.funnygreetings.com/mail6.htm
- Pick Rating: ★★★★★
- Popularity Rank: (551/1270)
- Date Added: *month, day, year*

→ 900
→ 920

Sample email  |subscribe|

Date: *day of week, date, time*
Subject: =-> Elevator FUN! <-=

Follow link below to view formatted message

<!-- Here is your Netgrab Fun Page, but

Edit My List Details

- Email address: ae7v9k7j0x43@mailshell.com
- Date created: month day, year
- Original list name: CNET Shareware Newsletter [ learn more ]
- List name: CNET Shareware Newsletter
- When a message is received:
  - ⦿ (Forward) Automatically forward it to me.
  - ○ (Save) Leave it in the Mailshell list.
  - ○ (Fwd/Save) Forward and leave a copy in the Mailshell list.
  - ○ (Unsubscribe now) Ignore it
  - ☐ (Unsubscribe later) Automatically unsubscribe after [30] days. — 1542
- Block SPAM Setting:
  - ⦿ Low (Do not forward known SPAM)
  - ○ Medium (Do not forward likely SPAM)
  - ○ High (Do not forward possible SPAM)
- Your review rating: ⦿ none  ○1 (bad)  ○2  ○3  ○4  ○5 (great)  — 1560
- Initial Submitted Profile: none
- Your Notes:

[ save list details ]  [ delete this list ]  [ reset ]  [ Help ]

1520, 1522, 1524, 1526, 1540

Featured Lists 1510, 1500

FIG. 15 mailshell™

- Most Popular
- Newest

SEARCH [ ] [for mailing lists ▼] [Go]
Example: ____ Expand Search, Search Tips

Users Picks

Users Picks
showing 1-10 of 73

Sort By: [user picks name ▼]

- Our Picks
- Users Picks

| User Name | ☒ User Picks Name | User Rating | Popularity Rank | Date Added | |
|---|---|---|---|---|---|
| Baseball Purist<br>(ID:1006380000) | Top Baseball Teams ← 1620<br>Major League Baseball news | ★★★★☆ | 32 | mm/dd/yr | · view lists |
| Outdoorsman<br>(ID:1006380000) | Active Lifestyle ← 1622<br>News, tips, and special deals for outdoor sport lovers | ★★★★★ | 31 | mm/dd/yr | · view lists |
| Health Nut<br>(ID:1006370000) | Attention Hypochondriacs! ← 1624<br>Everything you need to know to stay healthy & fit | ★★★★☆ | 13 | mm/dd/yr | · view lists |
| Auction Addict<br>(ID:1006380000) | Auctions R' Us<br>Auction alerts from popular online auctions | ★★★★☆ | 35 | mm/dd/yr | · view lists |
| Complete Car Crazy<br>(ID:1006380000) | Automotive Enthusiast<br>Newsletters for car and racing fanatics | ★★★★★ | 68 | mm/dd/yr | · view lists |
| "The Natural"<br>(ID:1006380000) | Baseball Nut<br>Baseball news and trivia | ★★★★★ | 67 | mm/dd/yr | · view lists |
| Beach Boy<br>(ID:1006380000) | Beachcomber Lifestyle<br>Cool newsletters and resources for beach lovers | ★★★★☆ | 60 | mm/dd/yr | · view lists |

1600, 1610, 1612, 1614

FIG. 16 mailshell™

Logout | My Lists | Options | Help

- Most Popular
- Newest

• Our Picks
• Users Picks

SEARCH [        ] for mailing lists (Power Search – Search Tips)

BASEBALL PICKS (ID:1006380000) | Top Baseball Teams

Date created: month day, year
Title of picks: Top Baseball Teams (public)
Description: Major League Baseball news
Created by user: Baseball Purist (ID:1006380000)
User's overall rating of lists: ★★★☆☆

Matching Lists
showing 1 - 7 of 7

Sort By: relevance

| Author | | List Name | Pick Rating | Popularity Rank | Date Added | |
|---|---|---|---|---|---|---|
| SportingNews | ☐ | The Sporting News - Yankees News - Text Format<br>Get New York Yankees news.<br>[weekly] - news | ★★★★☆ | 1292 | mm/dd/yr | · subscribe<br>· learn more<br>· samples |
| SF Gate | ☐ | SF Gate - Giants News - Text format<br>Receive Giants news and commentary.<br>[weekly] - news | ★★★★☆ | 2445 | mm/dd/yr | · subscribe<br>· learn more<br>· samples |
| Braves | ☐ | Braves Beat<br>[biweekly] - announcements | ★★★★☆ | 1496 | mm/dd/yr | · subscribe<br>· learn more<br>· samples |

FIG. 17

WEB PAGE FILTERING INCLUDING SUBSTITUTION OF USER-ENTERED EMAIL ADDRESS

FIELD OF THE INVENTION

The present invention relates to electronic messaging systems, and more particularly to using an intermediary to manage unwanted electronic messages.

BACKGROUND OF THE INVENTION

Accompanying the rapid increase in the use of electronic messaging systems has been an explosion of unsolicited mass marketing efforts using such systems. This has led to users being bombarded with unwanted messages and losing control over their privacy. In particular, the rapid growth in the use of e-mail over the Internet has led to a dramatic surge of mass unsolicited direct marketing e-mails commonly known as "junk" e-mails. While direct marketers and other senders have enjoyed the low cost distribution of advertisements enabled by mass unsolicited e-mail, users have seen electronic in-boxes flooded with e-mails that the users have no interest in receiving. Once a user has provided an e-mail address to another party, the ability of the user to preserve privacy and prevent unwanted or unauthorized use and sharing of the user's e-mail address is often limited or non-existent.

One approach for handling unwanted e-mails is to identify and block messages from an offending sender. For example, many e-mail systems and services have a "block sender" function for specifying an address from which no further e-mails will be accepted. Unfortunately, the sender generating the mass unsolicited e-mail can defeat such functions by using other software to automatically create new addresses from which to send the mass unsolicited e-mail. Such addresses may be false or used one time ("spoof" addresses), and may be generated as quickly as e-mail users and service providers can identify the offending addresses and block them.

Another approach for handling unwanted e-mails is for the recipient to abandon an e-mail address and create a new one. However, direct marketers use a number of techniques to obtain e-mail addresses, such as scanning postings on Internet sites that have news groups, chat rooms, directory services, message boards, and mailing lists. Also, to conduct electronic transactions over the Internet, an e-mail address must often be provided, but merchants involved in such transactions often sell lists of received e-mail addresses to third parties including direct marketers. Essentially, by having and using an e-mail address, a user cannot be assured that senders of mass unsolicited e-mail cannot obtain the e-mail address, resulting in receiving unwanted mass unsolicited e-mail.

Still another approach for handling unwanted e-mails and protecting privacy is by using anonymous e-mail. The anonymous e-mail user sends and receives messages using an e-mail address associated with the service provider so that other parties directly exchange e-mail messages with the service provider, not the user. The e-mails received by the service provider are made available for review by the user. The anonymous e-mail approach may protect the user's true identity, but the user still must contend with mass unsolicited e-mail that is sent to the user's anonymous address and the sharing of the anonymous address by others.

Based on the foregoing, there is a need for improved techniques for preventing and effectively managing unwanted electronic messages.

There is a particular need for a mechanism to insulate an e-mail user from receiving unsolicited e-mail, while preserving user anonymity at the same time.

There is also a need to implement such techniques to provide the user with a valid e-mail address that the user can use in e-commerce transactions or for other purposes.

SUMMARY OF THE INVENTION

The foregoing needs, and other needs that will become apparent for the following description, are achieved in the present invention, which comprises, in one aspect, a method for using a computer-implemented intermediary to manage electronic messages sent between e-mail resources and users. E-mail resources include mail lists, newsletters, or any entity to which the user wishes to provide an e-mail address. Unique addresses associated with an e-mail service are generated and used for each unique pairing of a user and an e-mail resource.

For example, the intermediary receives a request from a user to subscribe to an e-mail resource. The intermediary generates an address that is only associated with the user and the e-mail resource. The intermediary then sends the address to the e-mail resource in response to the user request to subscribe the user to the e-mail resource. When the e-mail resource sends a message to the user, the e-mail resource uses the unique address generated by the intermediary. A database associated with the e-mail service stores information about which user and which e-mail resource is associated with each unique address. For each message received by the e-mail service, the database information is used to identify the user for whom the message is intended and the e-mail resource from which the message is sent. The e-mail service holds the received messages for the user's review, forwards the messages to the user at another e-mail address provided by the user, or both.

In another aspect, a method for categorizing electronic messages using a set of message groups is disclosed. Messages are received for users by an e-mail service. Each message contains address data that is associated with one of the groups in the set of message groups. The messages received for a particular user are sorted into the message groups to which the user has subscribed by identifying the group that is associated with the address data for each message. The address data is also associated with a one user and one e-mail resource so that each message may be identified by user and e-mail resource based on the address data.

In yet another aspect, a method for using a computer-implemented intermediary to filter electronic messages is disclosed. When the e-mail service receives electronic messages for each user, the e-mail service identifies whether each messages is an unwanted electronic message, such as a mass unsolicited e-mail. If the message is identified as unwanted, the e-mail service ignores the message so that the user does not receive the unwanted message. A message may be identified as unwanted based on a number of factors. For example, the sending address of each message may be compared to a list of authorized sending addresses for a particular e-mail resource. Messages that are not from an address on the list of authorized sending addresses for an e-mail resource are likely to be unwanted. Also, the content of the message may be analyzed, such as to determine whether the message contains hidden images. Messages that contain hidden images are also likely to be unwanted.

In other aspects, the invention encompasses a computer apparatus, a computer readable medium, and a carrier wave configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 is a diagram that illustrates a listing of mail lists;

FIG. 6 is a diagram that illustrates the e-mail received for a user that is organized by the mail lists subscribed to;

FIG. 8 is a flowchart that illustrates a high level overview of a process for identifying unwanted e-mail messages;

FIG. 9 is a diagram that illustrates the information about an e-mail resource;

FIG. 10 is a diagram that illustrates a web page from an e-mail service that a user may use to visit another web page through a filter provided by the e-mail service;

FIG. 12 is a diagram that illustrates a filtered web page after a universal e-mail address is used in conjunction with a web site;

FIG. 13 is a diagram that illustrates a web page containing input fields for adding a new user profile;

FIG. 15 is a diagram that illustrates a web page containing the details of a mail list;

FIG. 16 is a diagram that illustrates a web page that includes a selection of user picks;

FIG. 17 is a diagram that illustrates a web page that includes a collection of e-mail resources associated with a user picks listing.

DETAILED DESCRIPTION OF THE PREFERRED EMBODIMENT

A method and apparatus for using an intermediary to manage unwanted electronic messages are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In the following description, the various functions are discussed under topic headings that appear in the following order:

I. OVERVIEW
   A. Using an E-mail Service to Subscribe to E-mail Resources
   B. Generating Unique Addresses
   C. Sorting E-mail Messages
   D. Analyzing E-mail Messages
II. UNIQUE ADDRESSING OF ELECTRONIC MESSAGES
III. DATABASES ASSOCIATED WITH AN E-MAIL SERVICE
   A. E-Mail Resource Database
   B. Author Database
   C. Authorized Sender Database
   D. User Profile Database
   E. Database Implementation
IV. CATEGORIZING ELECTRONIC MESSAGES
V. IDENTIFYING UNWANTED ELECTRONIC MESSAGES
VI. ADDITIONAL FUNCTIONS AND FEATURES OF AN E-MAIL SERVICE
   A. Subscribing to E-mail Resources
   B. Unsubscribing to E-mail Resources
   C. Auto-expiring E-mail Addresses
   D. Universal E-mail Addresses
   E. E-mail Senders Subscribing to a User
   F. Sharing User Picks Anonymously
   G. Blocking Hidden E-mail GIFs
   H. Subscriber Exchange
   I. E-mail Relevance Scoring
VII. HARDWARE OVERVIEW

I. OVERVIEW

A. Using an E-Mail Service to Subscribe to E-Mail Resources

Figure 1:
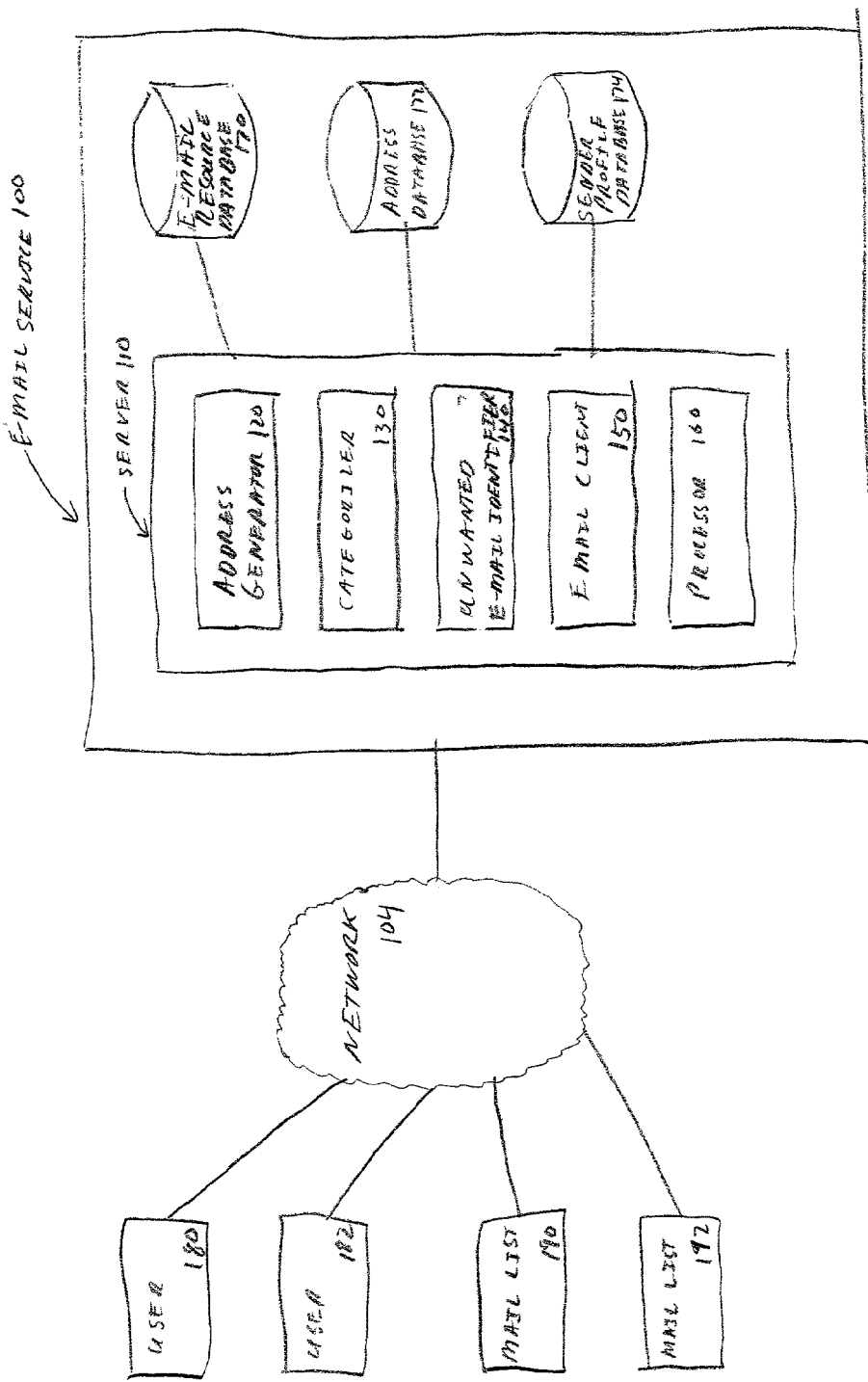
FIG. 1 is a logical block diagram that illustrates a high level overview of an intermediary that is used to manage unwanted electronic messages.

FIG. 1 is a logical block diagram that illustrates a high level overview of a system that includes an intermediary that is used to manage unwanted electronic messages. FIG. 1 shows an e-mail service 100 that is communicatively coupled to a network 104. E-mail service 100 may be any type of intermediary that facilitates the exchange of electronic messages between sending parties and receiving parties. Network 104 may be a local area network (LAN), wide area network (WAN), or other network, such as the world-wide packet data communication network now commonly referred to as the "Internet."

E-mail service 100 includes a server 110 that is comprised of the following elements: an address generator 120, a categorizer 130, an unwanted e-mail identifier 140, an e-mail client 150, and a processor 160. E-mail service 100 also includes an e-mail resource database 170, an address database 172, and sender profile database 174, all of which are communicatively coupled to server 110.

FIG. 1 shows users 180, 190 that are communicatively coupled to network 104 and mail lists 190, 192, that are also communicatively coupled to network 104. Users 180, 190 may be individuals that connect to network 104 via a general purpose computer. The term "mail list" as used herein refers to a service to which a user subscribes in order to receive messages sent by the service. The mail list service distributes messages to all of the users that have subscribed to the mail list. The messages may originate from an author associated with the mail list service, from users that have subscribed to the mail list, or from both sources.

If user 180 wishes to subscribe to mail list 190, user 180 navigates via network 104 by using a web browser to reach a web site that is associated with mail list 190. User 180 signs up with, or subscribes to, mail list 190 by providing the mail list with an e-mail address associated with user 180. After subscribing, user 180 will receive all of the e-mail messages that are sent by the service providing mail list 190. However, user 180 may also receive unwanted e-mails, such as mass unsolicited e-mails, if the service providing mail list 190 shares with other parties the e-mail addresses of the subscribers to mail list 190.

For the purposes of the overview provided herein, FIG. 1 is greatly simplified. For example, FIG. 1 only includes two users and two mail lists, whereas in practice an unlimited number of users and mail lists or other e-mail senders may be included. In addition, a mail list is only one example of an "e-mail resource" for which a unique address may be created for the user and the e-mail resource. Other e-mail resources may include, but are not limited to, newsletters, online stores, web-based services, registration web sites, or any other web site, company, organization, individual or other entity that asks a user for an e-mail address or to whom the user wishes to provide an e-mail address. Furthermore, FIG. 1 shows several separate databases, while in practice the information on the databases may be combined, separated, or included in additional databases not shown in FIG. 1. FIG. 1 shows only a single server is shown having several separate functional components, while in practice the e-mail service may employ many servers, and the functional components illustrated in FIG. 1 may be implemented by one or more processors on one or more servers.

According to one embodiment, user 180 subscribes to mail list 190 by using e-mail service 100. User 180 navigates the network to a web site that is associated with e-mail service 100 and selects mail list 190 from the mail lists offered by e-mail service 100.

Figure 2:
FIG. 2 is a diagram that illustrates a screen display comprising a home page of an e-mail service provider.

FIG. 2 is a diagram that illustrates a screen display comprising a home page of an e-mail service provider. FIG. 2 shows a home page 200 of the web site for e-mail service 100. At home page 200, user 180 may log in to e-mail service 100 via a "login" object 220 if user 180 has already joined e-mail service 100, or user 180 may join e-mail service 100 by selecting a "join now" object 210. After user 180 selects login object 220 or join now object 210, server 110 executes the corresponding login or registration procedure using processor 160.

Home page 200 also presents a top level index 230 of the available mail lists to which user 180 may subscribe using mail service 100. If user 180 wishes to see the mail lists available for a particular topic, user 180 selects an index object 240 that is associated with the particular topic. E-mail service 100 displays a lower level of mail listings in response to such input.

Figure 3:
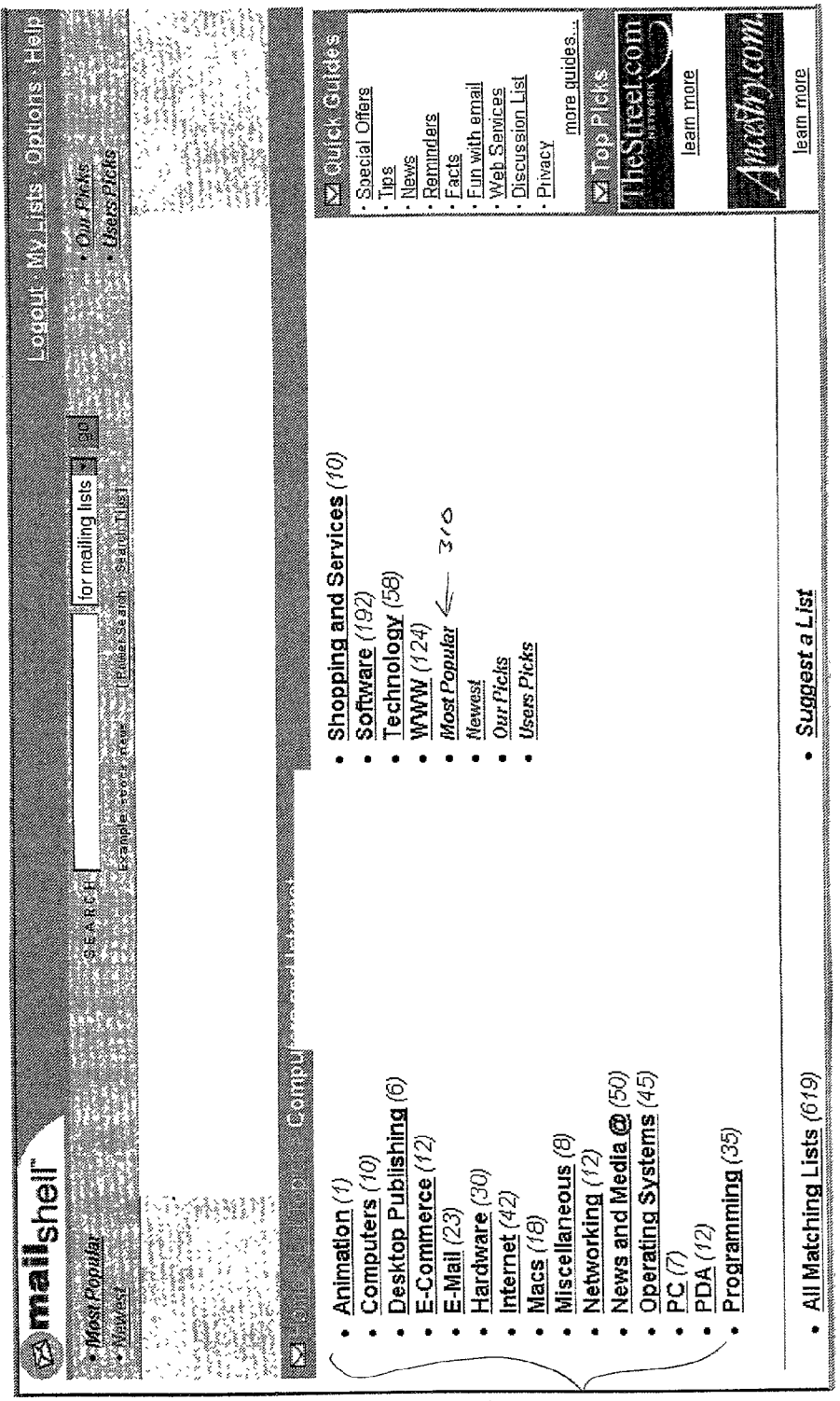
FIG. 3 is a diagram that illustrates a mail list sub-index of an e-mail service provider.

FIG. 3 is a diagram that illustrates a mail list sub-index of an e-mail service provider. FIG. 3 shows a sub-index 300 that lists sub-topics associated with the particular topic for index object 240.

If user 180 wishes to see a particular sub-topic for the particular topic, user 180 selects a sub-index object 310. E-mail service 100 displays a listing of mail lists for the particular sub-topic.

Figure 4:
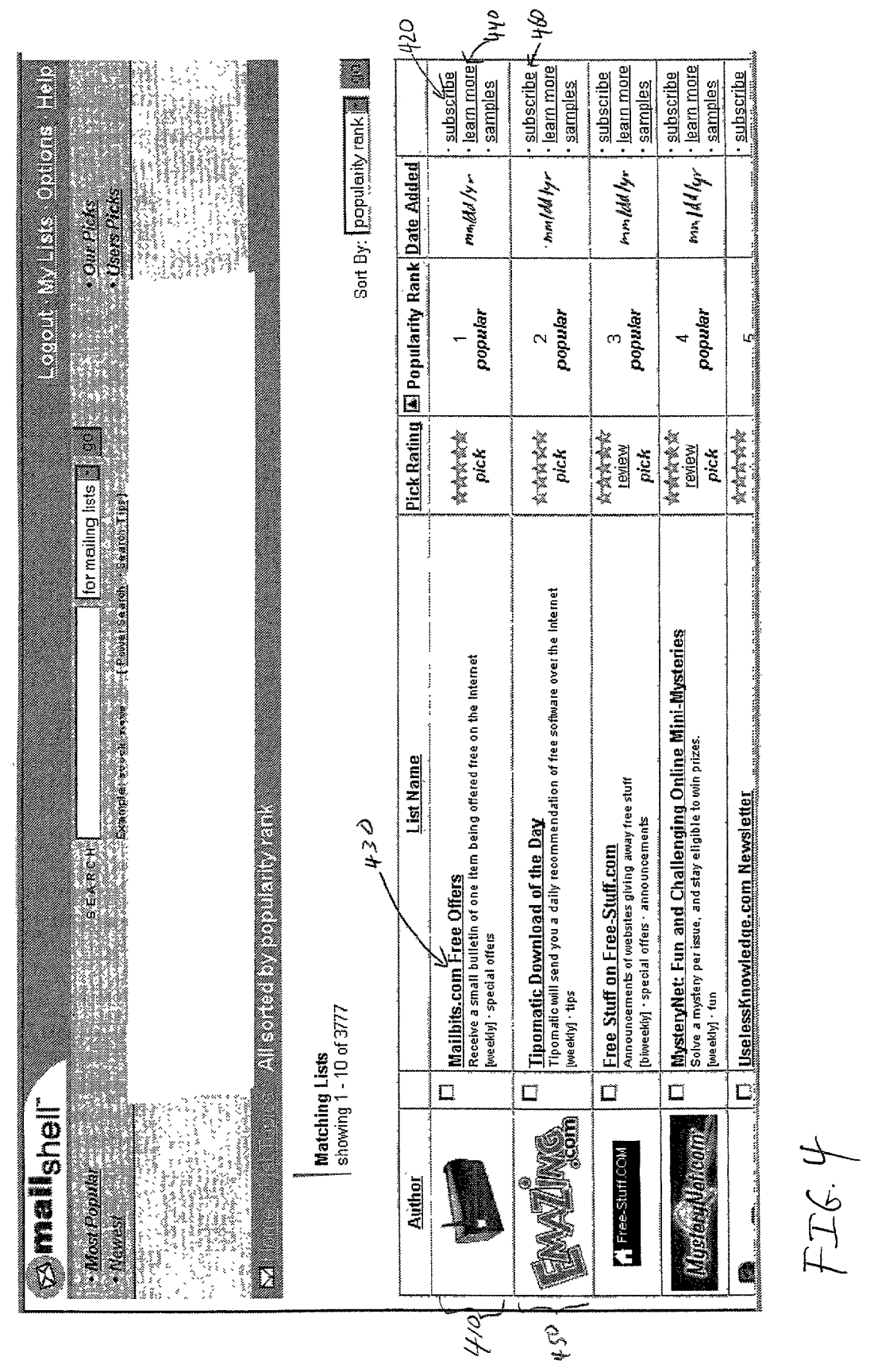

FIG. 4 is a diagram that illustrates a listing of mail lists. FIG. 4 shows a web page 400 that includes mail lists 410, 430. The information relating to the mail lists shown may be stored in e-mail resource database 170 of e-mail service 100, as shown in FIG. 1. If user 180 wishes to subscribe to mail list 410 as shown in FIG. 4, user 180 selects a subscribe object 420 that is associated with mail list 410.

B. Generating Unique Addresses

Figure 5:
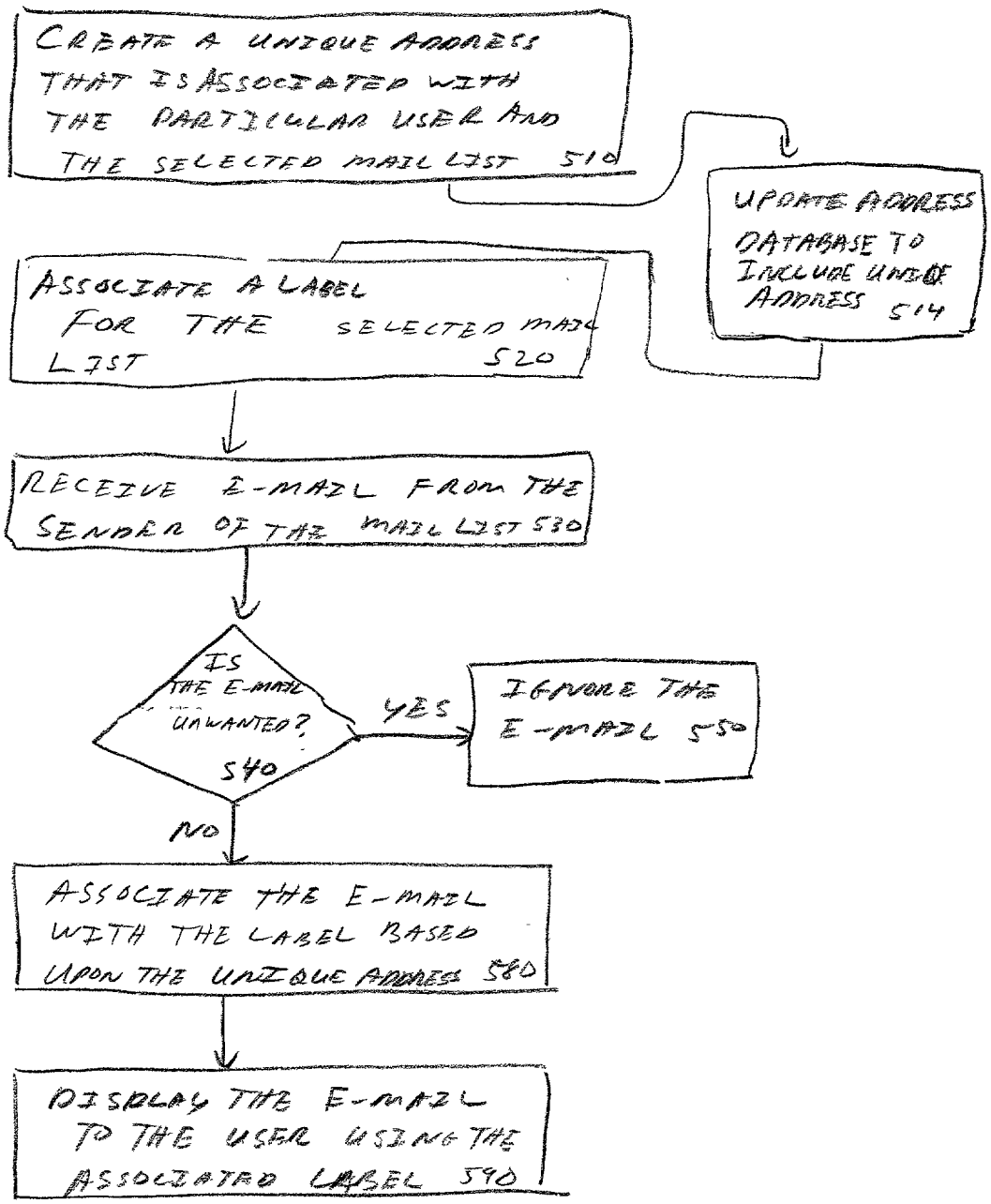
FIG. 5 is a flowchart that illustrates a high level overview of a method for using an intermediary to manage electronic messages.

FIG. 5 is a flowchart that illustrates a high level overview of a method for using an intermediary to manage electronic messages. The steps outlined in FIG. 5 will be described with reference to the system shown in FIG. 1, although the steps of FIG. 5 are not limited to the specific details of the system shown in FIG. 1.

Assume that mail list object 410 corresponds to mail list 190 in FIG. 1. When user 180 selects subscribe object 420, address generator 120 creates a unique address that is associated with e-mail service 100, as shown in step 510. The address that is created is unique for the specific pairing of user 180 and mail list 190. Other pairings of user 180 with other mail lists will each have their own unique address associated with e-mail service 100. Similarly, other pairings of mail list 190 with other users will each have their own unique address associated with e-mail service 100.

For example, the unique address for a pairing of a particular user and a particular mail list may be a random e-mail identifier, or userID, such as "zek294", at the domain of e-mail service 100. If e-mail service 100 is associated with the domain "mailshell.com", the resulting e-mail address is zek294@mailshell.com.

After creation of the unique address, an entry is added to address database 172, as shown in step 514. The new entry to address database 172 includes the new unique address and specifies that the new unique address is associated with user 180 and mail list 190. Because the address is unique to user 180 and mail list 190, the unique address will not be associated with any other user or mail list.

In step 520, an identifier, label, category, or other descriptive object is associated with the mail list. For example, for mail list object 410 in FIG. 4, the label may be a label object 430 that identifies the topic of the selected mail list. The label is used to present e-mails received by mail service 100 for user 180 from mail list 190, as discussed below, which assists the user in determining the origin of a particular message among many that are received. The label may be associated with a profile for the sender in sender profile database 174.

C. Processing Received E-Mail Messages

In step 530, e-mail service 100 receives an e-mail message for user 180 from the author of mail list 190. The e-mail is addressed using the unique address created in step 510.

In step 540, a check is made to determine whether the e-mail is unwanted, or invalid, such as a mass unsolicited e-mail. The processing of identifying unwanted e-mail is discussed below in conjunction with FIG. 8. If the e-mail is determined to be unwanted, then the e-mail is ignored and the user will not see the message. If the e-mail is not unwanted, then the processing of the e-mail continues on to the next step.

In step 580, the e-mail message is associated with the label for the mail list, or author of the message. Because the address contained in the e-mail is unique for user 180 and mail list 190, e-mail service 100 can look up which user and mail list are associated with the message based upon the entry added to address database 172 in step 514. Given the unique address and the information in address database 172, the author can be determined and the label associated with that sender may be identified thereby.

In step 590, the e-mail message is displayed for user 180 by associating the e-mail with the label corresponding to mail list 190.

Figure 6:
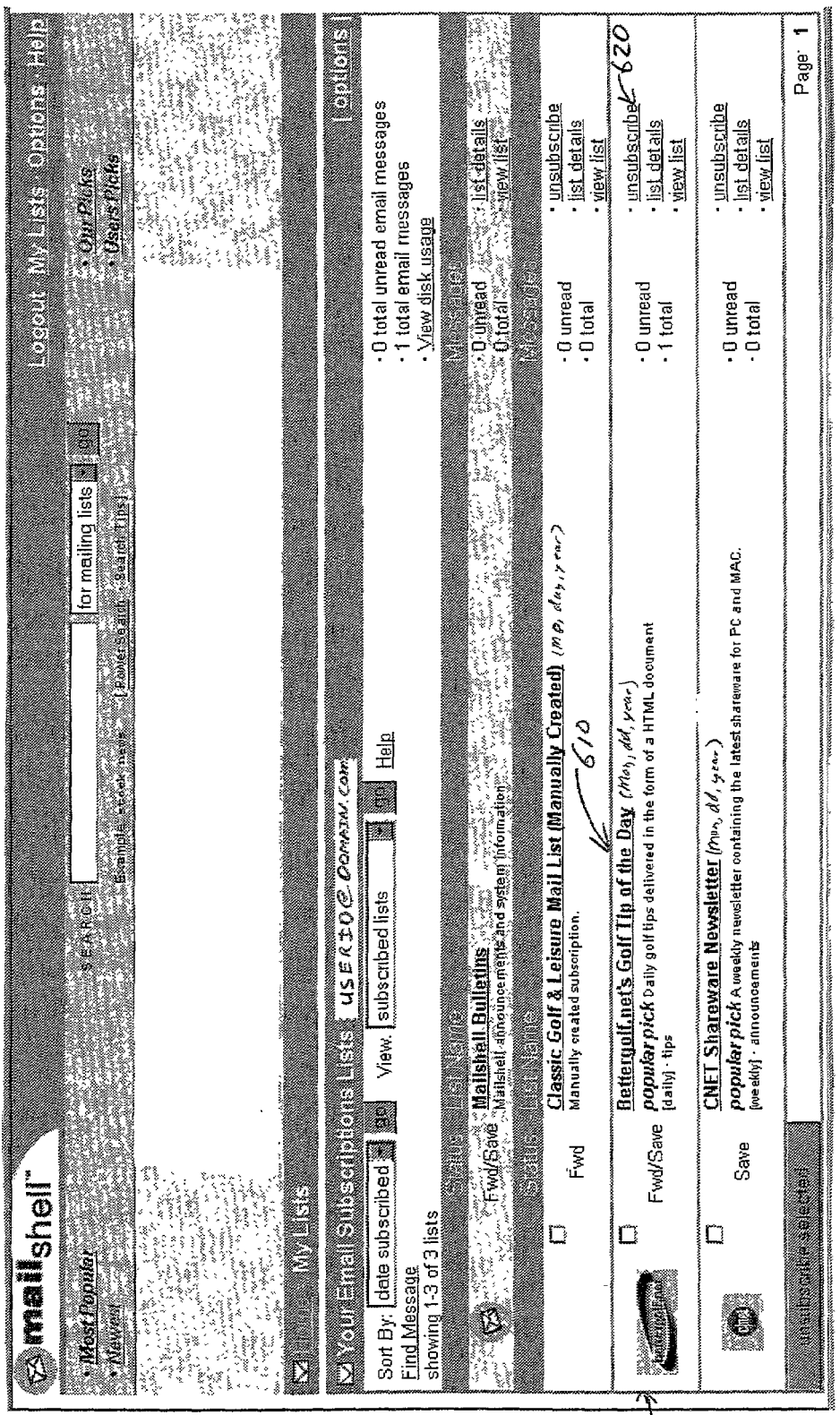

FIG. 6 is a diagram that illustrates the e-mail received for a user that is organized by the mail lists to which the user has subscribed. FIG. 6 illustrates a display 600 of the e-mail received for a user organized by the e-mail resources to which the user has subscribed. E-mail client 150 of FIG. 1 generates display 600. By selecting an identifier object 610 that is associated with a particular label, user 180 can review the e-mail messages received for the corresponding unique address.

Figure 7:
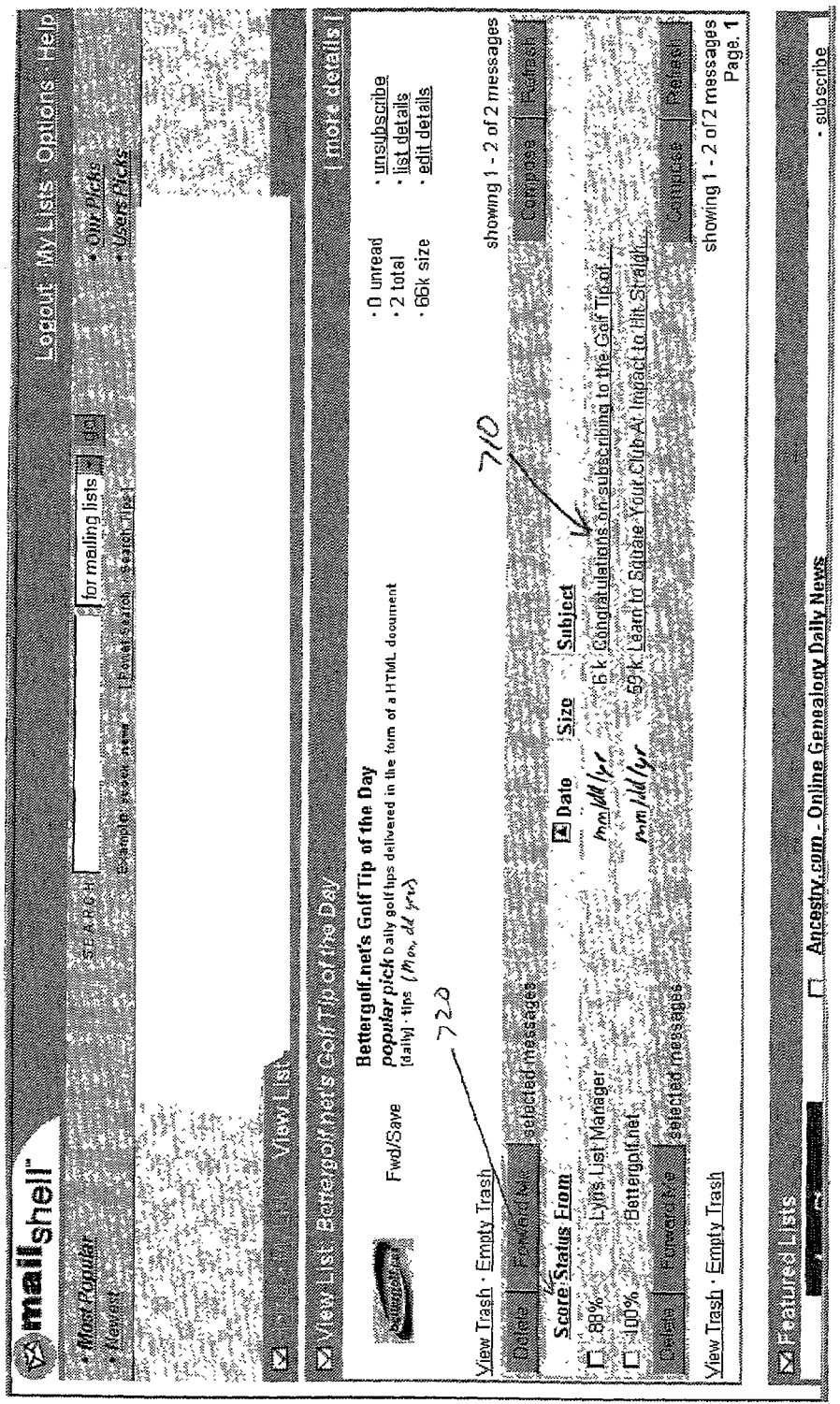
FIG. 7 is a logical block diagram that illustrates the e-mail messages received for a particular mail list.

FIG. 7 is a logical block diagram that illustrates the e-mail messages received for a particular mail list. FIG. 7 illustrates a listing 700 of the e-mail received for mail list 190 that is associated with label object 610. User 180 may read a particular e-mail listed for identifier object 610, such as by selecting a subject object 710.

D. Analyzing E-Mail Messages

The discussion above assumes that the e-mail received for user 180 was a valid e-mail from the sender, or author, of mail list 190. However, the author of mail list 190 may have shared the list of subscribers to mail list 190 with other e-mail senders who have sent e-mails to user 180, which are not wanted by user 180. For example, the author of mail list 190 may have sold the subscription list for mail list 190 to a direct marketing company that is sending advertisements unrelated to the subject of mail list 190 (e.g., mass unsolicited e-mail). According to one embodiment, the likelihood that a particular e-mail is mass unsolicited e-mail, or a junk e-mail, can be determined by analyzing the sender address of the e-mail and the content of the e-mail.

FIG. 8 is a flowchart that illustrates a high level overview of a process 800 for identifying unwanted e-mail messages.

In step 810, a list of authorized sending addresses is generated. For example, authorized addresses may include addresses associated with the web site of the author of mail list 190, addresses from which other e-mails have been received for mail list 190, and other address that have been determined previously to be valid. Step 810 may be carried out in advance of processing e-mails, or as e-mails are processed.

In step 820, e-mail is received that includes both an address of the sender of the e-mail and the contents of the e-mail. The e-mail is addressed to the unique address for user 180 and mail list 190.

In step 830, unwanted e-mail identifier 140 compares the address of the sender of the e-mail to the list of the authorized sender addresses generated in step 840. The e-mail may be valid for mail list 190 if the address of the send is in the list of authorized senders. However, merely because the address of the sender is on the list is not conclusive because the sender of previously valid e-mails may be sending unrelated and unsolicited e-mail from the same address as the previously valid e-mails.

If the address of the sender is not on the list, then the e-mail is invalid, or not wanted by the user. However, merely because the address of the sender is not on the list also is not conclusive because the sender may be using a new e-mail address for sending a valid, or wanted, e-mail for mail list 190.

In step 840, the contents of the e-mail message are analyzed. For example, the e-mail may contain hidden images that cause a cookie to be stored on the computer used by user 180 or that cause user data to be sent to a server that is not associated with user 180, e-mail service 100, or an authorized sender. Such hidden images may comprise, for example, definitions of GIF images having colors defined as transparent, etc. Identifying such hidden images results in an analytical determination by process 800 that the e-mail is unwanted by user 180. Also, the contents of the e-mail may be scanned for key words that relate to the e-mail resource to determine whether the text included in the e-mail is likely related to the topic of mail list 190.

In step 850, unwanted e-mail identifier 140 generates a score value based on the results of comparing the sender address to the authorized list of sender addresses and the results of analyzing the contents of the e-mail message. The score value represents the likelihood that user 180 will be interested in receiving the e-mail. If the value is high, then there is a strong likelihood that user 180 would want to receive the message, and thus the e-mail is probably a valid e-mail for mail list 190. However, if the value is low, then it is likely that user 180 would not want to receive the message, and thus the e-mail is probably not valid for the mail list 190.

In step 860, the score value is compared to a predetermined threshold value to identify whether the e-mail should be accepted or ignored. The value for deciding whether the e-mail is valid and should be included in the list of e-mails for mail list 190, as opposed to invalid and therefore should be ignored, may be specified by e-mail service 100, or user 180 may control the value. If the score value exceeds the threshold value, then the test of whether the e-mail is unwanted in step 540 of FIG. 5 will be valid.

II. UNIQUE ADDRESSING OF ELECTRONIC MESSAGES

According to one embodiment, a unique address is created for each pairing of two entities or parties that exchange electronic messages. For example, in FIG. 1, if user 182 subscribes to an e-mail resource such as mail list 192 via e-mail service 100, a unique address associated with mail service 100 is generated specifically for user 182 to receive e-mail from mail list 192. User 182 may also use the address to send e-mail to mail list 192. However, if user 182 subscribes to other mail lists, such as mail list 190, another unique address is generated specifically for user 182 at the domain of e-mail service 100 to send and receive e-mail with mail list 190. Similarly, if user 180 subscribes to both mail list 190 and mail list 192, two more unique addresses will be generated, one for the pairing of user 180 with mail list 190 and one for the pairing of user 180 with mail list 192. Thus, for every pairing of a user and an e-mail resource via e-mail service 100, there is one address that is uniquely associated with the user and the e-mail resource.

The e-mail service provider generates the unique address for each pairing of a user and an e-mail resource. For example, in FIG. 1, e-mail service 100 is comprised of a server 110 that includes an address generator 120. However, a dedicated address generator is not required for generating the unique address for a particular pairing of a user and a mail list. For example, the unique address may be generated by one or more processors, such as processor 160 in FIG. 1, or one or more servers, not just server 110.

In response to a user request to subscribe to an e-mail resource, address generator 120 creates a unique address userId that is associated with user 182 and mail list 192. The unique address userId may be entirely composed of characters selected at random, such as "zek294". The use of random characters provides the user with anonymity because the e-mail resource does not receive any identifying information about the user via the unique address. The use of random characters allows for a virtually unlimited pool of unique addresses, which also makes it more difficult for senders of mass unsolicited e-mail to blindly send unwanted e-mails to users of the e-mail service. In addition, the use of the e-mail service to filter interactions with e-mail resources provides anonymity because the e-mail resources do not directly interact with the user or the user's computing device.

Based on the example unique address userID "zek294" discussed above, and if the domain of the e-mail service provider is "mailshell.com", the unique address for user 182 and mail list 192 in FIG. 1 is zek294@mailshell.com. If user 182 subscribes to another e-mail resource, such as mail list 190 in FIG. 1, another unique e-mail address is generated for the pairing of user 182 and mail list 190, such as a7b8c9@mailshell.com. Similarly, if user 180 subscribes to mail list 190, another unique e-mail address is created for the pairing of user 180 and mail list 190, such as j65jkl423rt@mailshell.com, and if user 180 subscribes to mail list 192, yet another unique e-mail address is created, such as 83kc34ng8 @mailshell.com.

In addition to using a domain associated with the e-mail service provider, subdomains may be incorporated into the e-mail address. For example, if the user subscribes to a mail list concerning sports, the unique e-mail address for the user and the sports-related mail list may be 28rtvex91vb@sports.mailshell.com. The e-mail service provider itself may establish subdomains to assist with the processing of incoming e-mails. The e-mail service also may allow users to specify a subdomain to use with one or more unique addresses for that user. A user may wish to use subdomains to assist in tracking and grouping messages received by the e-mail service for the user.

In another embodiment, some characters in the unique address may be non-random to facilitate more efficient processing of e-mail messages received by the e-mail service provider. For example, the first two characters of the unique address may be specified to correspond to a particular server out of a plurality of servers at the e-mail service provider. Based on a mapping between the two character identifiers used at the beginning of the unique address, an incoming e-mail may be directed to the server that handles the e-mail for the user associated with the unique address of the incoming e-mail.

The unique address is stored in a database created and maintained by the e-mail service provider, such as address database 172 in FIG. 1. The database entry for each unique address includes the address itself and at least one label, name, or other identifier for both parties to the exchange of electronic messages via the unique address. For example, the identifier for the user of the e-mail service may include an electronic e-mail address that is not associated with the e-mail service so that the e-mail service may forward to the user electronic messages received by the e-mail service. The user of the e-mail service may select an identifier that is unrelated to another e-mail address, in which case the user logs in to the e-mail service to review electronic messages sent to the unique addresses associated with the user. Whatever the identifier that is associated with each user, the e-mail service provider can identify messages intended for each user by matching the unique address specified in an electronic message with each user identifier associated with the unique address in the address database.

For the e-mail resource, the identifier included in the address database may include an e-mail userID, domain name, or a combination thereof from which the e-mail resource sends messages to subscribers. The identifier for the e-mail resource may be a descriptive label associated with the e-mail resource, such as the name of a mail list, or the identifier may be the unique address itself. Whatever identifier is associated with the e-mail resource for a unique address, the messages sent to the user at the e-mail service provider via the unique address may be associated with the identifier specified in the address database for the other party.

III. DATABASES ASSOCIATED WITH AN E-MAIL SERVICE

A. E-Mail Resource Database

According to one embodiment, the e-mail service creates and manages a database of e-mail resources to which users can subscribe. The e-mail resource database contains a variety of types of data relating to each e-mail resource that is available for subscription via the e-mail service provider. FIG. 9 is a diagram that illustrates the information about a mail list. FIG. 9 illustrates web page 900 showing information about a mail list, including an "about list" object 910 and a "sample e-mail" object 930, both of which contain information that may be contained in an e-mail resource database, such as e-mail resource database 170 in FIG. 1.

"About list" object 910 provides examples of the types of information about an e-mail resource that may be stored in an e-mail resource database including, but not limited to, the following: a pick rating with a graphical indicator of a rating value assigned to the resource by e-mail service 100; a popularity rank indicating how popular the resource is among the resources available through the e-mail service; the date the e-mail resource was added to the e-mail service, the language(s) used by the e-mail resource, the maturity level of the intended audience of the e-mail resource, the frequency that the resource sends messages to subscribers, the average size of the e-mails sent by the resource, the number of subscriptions through the e-mail service to the resource, the overall subscription size of the resource including all subscribers instead of just those subscribing through the e-mail service, and a description of the type or category of e-mail resource (e.g., tips, shopping information, word of the day, etc.).

"Sample e-mail" object 930 provides one or more sample e-mails for the e-mail resource. The e-mail sender, or author, may send the samples to the e-mail service, or the e-mail service may use actual e-mails sent to subscribers of the e-mail resource. The sample e-mail(s) for the resource may also be included in the e-mail resource database.

Other information may be included in the e-mail resource database. For example, the e-mail service may provide a review of the resource, which may include a variety of commentary about the resource, including but not limited to, the subject of the resource, the coverage of the subject by the resource, and the popularity of the resource among both users of the e-mail service and among web users in general. Review information generated by the e-mail service is typically made available for review by users of the e-mail service.

Additional information may be included in the e-mail resource database that is not generally made available to users of the e-mail service. For example, the e-mail resource database may indicate for each resource whether messages sent by the author of the resource contain hidden images. The database may also include information about how the hidden images are used, such as for positioning of other objects for display to the user or to set a cookie that may be used to provide user information to another party. The additional information included in the e-mail resource database may be obtained by the e-mail service analyzing actual messages sent to subscribers or sample messages provided by the author of the resource, and then creating and storing values in the database that represent results of the analysis.

B. Author Database

According to another embodiment, the e-mail service creates and manages a database of authors of electronic messages. The author database contains a variety of types of data relating to each author of the e-mail resources that are available from the author via the e-mail service. For example, FIG. 9 shows web page 900 that includes information about a mail list, including an "about author" object 920 that contains information that may be contained in a database, such as sender database 174 in FIG. 1.

In response to a user selecting "about author" object 920, e-mail service 100 provides examples of the types of information about an e-mail resource that may be stored in a sender database including, but not limited to, the following: the home page of the author, a description of the author's home page (or service) provided by the author, a direct subscription link that takes a user directly to the web page used by the e-mail resource to take subscriptions (which may bypass any "filters" provided by the e-mail service provider, as discussed below), the pick rating of the author along with a graphical indicator of the rating, the popularity rank of the author, and the date that the author was first added to the e-mail service provider's list of authors. Such information may be displayed in a screen display sent by e-mail service 100 to the user.

Information that is specific to a particular resource is generally included in the e-mail resource database, whereas information that pertains to the author and thus is applicable to all of the mail lists provided by the author is generally included in the author database. However, the division between information included in the e-mail resource database and the author database may vary, and any information may be included in one or both databases.

C. Authorized Sender Database

For a particular mail list, an author may send messages from a number of different e-mail addresses. The different e-mail addresses may reflect different userID's at a single domain used by the author of the e-mail resource to send messages to subscribers, or the different e-mail addresses may reflect more than one domain from which the author sends messages for the e-mail resource. Therefore, the author of an e-mail resource may send valid or wanted e-mails from a variety of sender e-mail addresses to a user that has subscribed to the e-mail resource at the unique address provided by the e-mail service.

However, the author of the e-mail resource may also use the subscriber list for the e-mail resource to send messages to subscribers about subjects that are unrelated to the subject of the resource, or the author may share the subscriber list with other parties from whom the user does not wish to receive e-mails. Thus, an e-mail message received by the e-mail service for a particular user via the unique address for that user and the corresponding e-mail resource may or may not be a valid message for the e-mail resource to which the user subscribed.

In yet another embodiment, a database of authorized sending addresses is created and maintained. Whether or not a sending address should be added to the list of authorized sending addresses may depend on a number of factors or criteria. For example, if the sending address has the same domain name as that of the author, then the sender address is properly included on the authorized sender list. Conversely, if the domain name is unrelated to that of the author, then that would indicate the address is not a proper sender address to include on the authorize sender list.

Also, the e-mail service provider may inspect the message header and contents of a message for other information to determine if the sender address should be added to the authorized sender database. For example, if the subject line is the same or similar to previous subject lines of valid e-mails, then the sender address is likely authorized, and vice versa. Likewise, the contents of the message may be inspected to compare to prior valid messages for the mail list, and if consistencies are found, then the message is more likely valid than not.

Similarly, sender addresses may be removed from authorized senders database. For example, if an invalid message that is not wanted or desired for an e-mail resource is received from a sender address included in the authorized sender database, such as from a mass marketer, then e-mail service 100 may choose to remove the address from the authorized sender database.

According to one embodiment, the database of authorized sender addresses is organized by e-mail resource. For example, each e-mail resource may have a list of authorized sender addresses. The same collection of authorized sender addresses is used for all users of the e-mail service that subscribe to the particular e-mail resource.

According to another embodiment, the database is organized by user. For example, each unique address has a list of authorized sender addresses. Thus, there is a different set of authorized sender addresses for one user than for another user. The difference between the two sets of authorized sender addresses may be due to a number of factors, such as the preferences of the user and the user's past behavior in terms of reading or deleting messages from the particular sender address. For example, if the author of a mail list on golf courses in the United States switches the subject of the messages, say to golf courses outside of the United States but the author keeps using the same sender address, some users may be interested in the new type of messages while others may not. Therefore, the previously valid sender address may remain valid for one user but not another.

D. User Profile Database

According to another embodiment, a database for storing information about users is created and maintained. The user information may be organized in a variety of ways, such as by having a user profile for each user. The user profiles may be used by the e-mail service to complete subscription forms for e-mail resources, thus eliminating the need for users to provide such information in response to multiple requests.

A user may establish more than one profile and specify the profile to be used by the e-mail service when the user subscribes to a particular e-mail resource. User profiles may contain any information that the user specifies, including both accurate information about the user and also made up information to protect the user's privacy. The user may also modify or delete information from a user profile that the e-mail service incorporates into a subscription form before submitting the subscription form.

Figure 13:
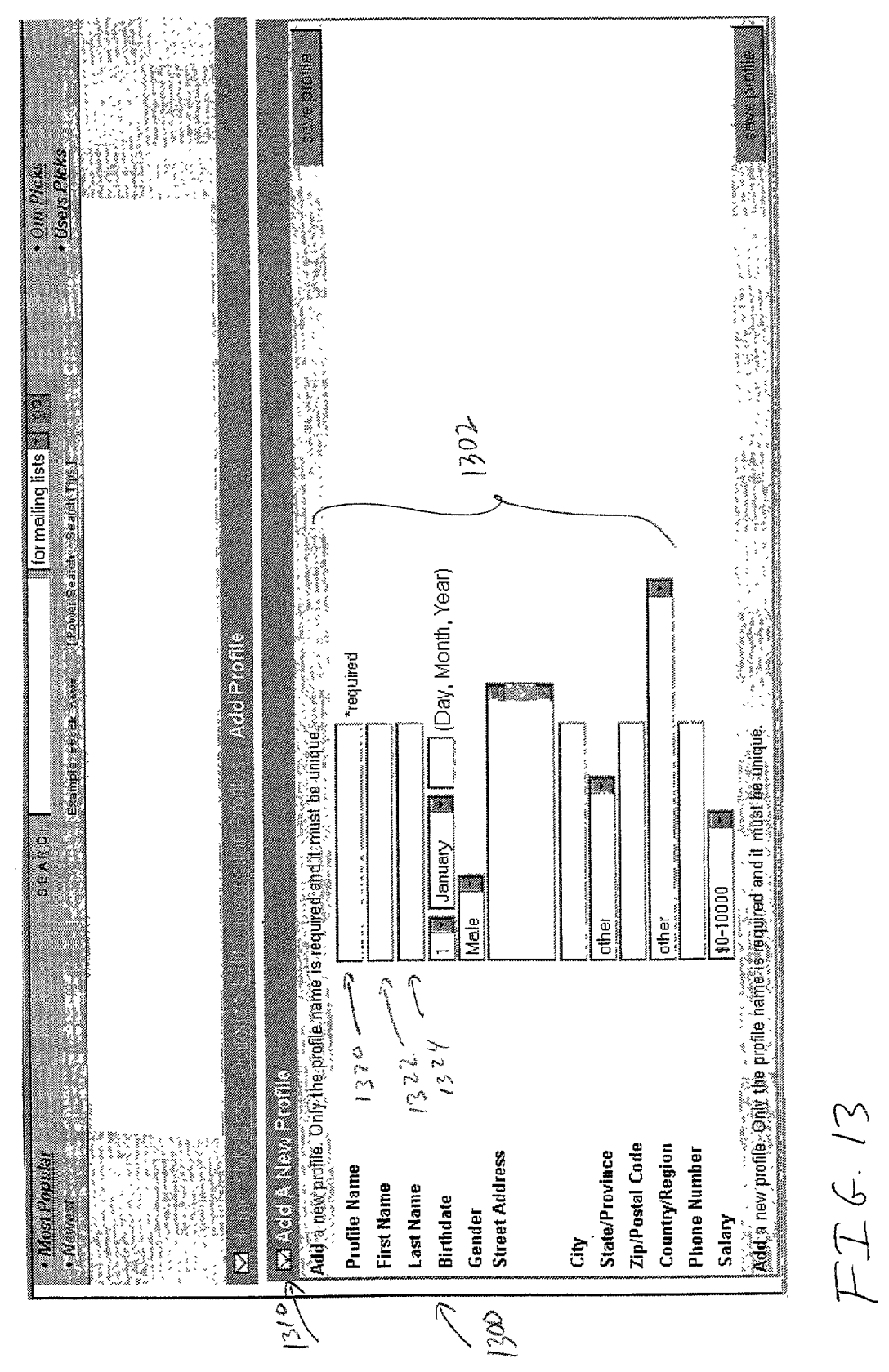

FIG. 13 is a diagram that illustrates a web page containing input fields for adding a new user profile. FIG. 13 shows a web page 1300 that includes an "add a new profile" object 1310 for use by a user in establishing a new user profile. "Add a new profile" object 1310 includes a number of input fields 1302 that illustrate the types of information that may be included for the particular user's profile in a user profile database. For example, input fields 1320, 1322, 1324 are provided, respectively, for the following types of information: a name to identify the user profile (since a user may establish more than one user profile), a first name for the user profile, and a second name for the user profile. The types of information that may be included in the user profile database are not limited to the specific examples discussed above and may include other types of information, including but not limited to, address data, birth date, gender, phone number, and salary.

Once a user profile is created, the user may edit or delete the user profile. Also, the user may designate a particular user profile as the default user profile to be used whenever the user subscribes to a new e-mail resource. However, the user may switch to another user profile instead of the default user profile when subscribing to an e-mail resource.

Figure 14:
FIG. 14 is a diagram that illustrates a web page containing a subscription form.

FIG. 14 is a diagram that illustrates a web page containing a subscription form. FIG. 14 shows a subscription confirmation web page 1400 that includes a subscription form object 1410. A select profile object 1420 is included with subscription form object 1410. Select profile object 1420 allows the user to select the profile to use when subscribing to the selected mail list(s).

Subscription form object 1410 also includes input fields 1430, 1432 that are required by the author of the mail list to subscribe to the mail list. For example, input field 1430 may be a first name of the user and input field 1432 may be a last name of the subscriber. However, in practice, subscription form 1410 may include a variety of input fields, including fields for all of the types of information reflected in the user profile database. Also, subscription form 1410 may include input fields for user information that is not included in the user profile database and thus must be supplied by the user. Typically, subscription form 1410 will include only those input fields that are required by the author of the e-mail resource to subscribe.

The e-mail service may also complete fields on a subscription form that do not exactly match information in the user profile based on a mapping between the subscription form fields and data included in the user profile. For example, the user profile may contain the birth date for the user. However, a particular subscription form may ask for the user's age. The e-mail service may use a mapping between the age field on the subscription form and the birth date in the user profile to determine the user's age and include the age in the subscription form.

E. Database Implementation

The database discussion above included four different types of databases: an e-mail resource database, an author database, an authorized sender database, and a user profile database. While each of the databases herein are described as being separate, in practice the databases may be combined or further separated. For example, all of the information for the four databases described above may be included in a single database, the information in the author and authorized sender databases may be combined, or more than one database may be used instead of just a single database, such as a separate authorized sender database for each e-mail resource.

IV. CATEGORIZING ELECTRONIC MESSAGES

According to one embodiment, messages received by an e-mail service are categorized into grouped listings for each user. The e-mail service receives messages from the e-mail resources to which the users of the e-mail service have subscribed. Each message contains a unique address that was generated by the e-mail service when the user subscribed to the e-mail resource. As discussed above, each unique address is associated with specific pairing of one user and one e-mail resource, thereby enabling the identification of both the user and the e-mail resource based on the information stored with the unique address in an address database. Each message received by the e-mail service for each user is sorted into a group, or folder, that the e-mail service establishes for each e-mail resource.

The e-mail service identifies the user to whom the message is intended based on a mapping of the unique address to the user, such by using the information contained in address database 172 in FIG. 1. For the messages intended for a particular user, the messages are categorized, or sorted, based upon the e-mail resource to which each message is associated based on a mapping of the unique address to the e-mail resource, such as by using the information contained in address database 172. After each message is matched to the user and e-mail resource, the messages are displayed to the user in a grouped listing, such as that shown in FIG. 6, which may be generated by e-mail client 150 of FIG. 1. The grouped listing may include all e-mail resources for which the user has subscribed or some subset thereof, such as the e-mail resources for which the user has unread e-mails.

In addition, the user may specify for each e-mail resource that the e-mail service forward messages to another e-mail address provided by the user. The forwarding feature of the e-mail service may be either in lieu of or in addition to presenting the user with a grouped listing of messages via the e-mail service itself.

The user may manage the e-mails received by the e-mail service using the e-mail client provided by the e-mail service. For example, the user may read, reply, forward, delete, compose a new e-mail to send to the e-mail resource, or perform other actions offered by the e-mail service. The user may specify the organization of the groups, or folders, of messages, allowing some to be combined or collapsed into another group, or folder. The user may specify that only unread messages be presented, or only messages received within a certain time period or after a certain date. The user may modify the group headings, or folder names.

Because the unique addresses allow for the e-mail service to sort the messages into a set of groups, the user may avoid having to manually sift through a single e-mail in-box into which all messages are deposited. Each message will be placed in a folder corresponding to the e-mail resource that corresponds to the unique address used for the message, and each folder is identified by a descriptive label that the e-mail service provides and which the user may modify, if desired.

V. IDENTIFYING UNWANTED ELECTRONIC MESSAGES

In addition to sorting messages received by the e-mail service for a user based on the e-mail resources to which the user has subscribed, the e-mail service screens the messages to identify and then discard, conceal, or reject any messages that the user has no desire or interest in receiving. For example, the author of the e-mail resource may use subscriber addresses to send other messages unrelated to the subject of the e-mail resource to which the user subscribed, or the author may share subscriber addresses with others parties, such as direct marketers who send mass unsolicited messages.

According to one embodiment, messages received by the e-mail service are analyzed to determine whether the messages are valid and should be passed along to the user or whether the messages are unwanted and should be ignored. A measurement of the likelihood that a particular e-mail is unwanted may be determined by considering a variety of factors, or criteria, such as the sending address of each e-mail and the content of each e-mail.

Whether or not the sending address is included in a database of authorized sending addresses is one factor that may be considered in determining whether a message is unwanted. A message is more likely to be unwanted if the sending address of the message is not in the database of authorized sending addresses because e-mail resource authors will often continue to use the same address to send messages to subscribers. However, there may be situations in which the e-mail resource author uses a new sending address for normal messages for the e-mail resource, and the new sending address may not be in the authorized sending address database. Therefore, whether or not the sending address is included in the database of authorized senders is helpful in determining whether the message is unwanted, but it is not conclusive.

Another factor that may be considered in determining whether a message is unwanted is an analysis of the contents of the message. For example, the e-mail may contain a hidden image that causes a cookie to be stored on the client, and the cookie may cause user data to be sent to a server associated with an outside party. A message having such a hidden image is indicative that the e-mail is a mass unsolicited e-mail or otherwise undesired by the user because typical messages for an e-mail resource would primarily provide information to the user and therefore not involve setting cookies at the client. As another example, the contents of the e-mail may be scanned for keywords that relate to the topic or subject of the e-mail resource to determine whether the text included in the message appears related to the topic of the e-mail resource. The contents of the e-mail that may be scanned include the body of the message and the subject line of the message.

The measurement of the likelihood that a particular e-mail is unwanted may include other factors. For example, the e-mail service may identify that the same message has been sent to a large number of users of the e-mail service that have not all subscribed to the same e-mail resource. Such a mass mailing may indicate that the e-mail sender has sent a mass unsolicited e-mail by randomly guessing at e-mail addresses associated with the e-mail service. The e-mail service may identify such a mass mailing as likely being unwanted by the users to which the messages are addressed and treat that determination as one factor in identifying whether the messages are unwanted.

Another example of a factor to consider in determining whether an e-mail is unwanted is the history of previous actions by the user to which the message is addressed. For example, a user may subscribe to several mail lists concerning a variety of sports. The e-mail service may receive a new message from a previously unknown sender, and the new message may be addressed with a unique addresses previously generated for the user and one of the sports mailing lists to which the user has subscribed. If the content of new message concerns sports, the e-mail service may consider that as one factor that indicates that the user wants to receive the message. However, if the content of the new message concerns real estate investments and the user has not previously shown an interest in such messages, the e-mail service may consider that as one factor that indicates that the message is unwanted.

According to another embodiment, the e-mail service uses the results of the analysis of the messages to generate a score value that represents the likelihood user associated with the unique address to which the e-mail is sent will be interested in receiving the e-mail. If the value is high, then there is a strong likelihood that the user would want to receive the message, and thus the e-mail is probably a valid e-mail for the e-mail resource. However, if the value is low, then it is likely that the user would not want to receive the message, and thus the e-mail is probably not valid for the e-mail resource. The e-mail service may provide the value to the user for consideration, such as that shown in FIG. 7 by using a score object 720.

In yet another embodiment, the score value representing the likelihood that the e-mail is valid is compared to a predetermined value to identify whether the e-mail should be accepted or ignored. For example, the value may be expressed as a percentage in which 100% represents a message is proper for the e-mail resource, 0% represents that the message is not proper for the e-mail resource, and values between 100% and 0% indicate the likelihood that the message is proper. If the predetermined, or threshold, value is 50%, and an e-mail message is analyzed and found to have score value of 60%, the message will be made available to the user. However, if the message is analyzed and found to have a value of 30%, then the message is discarded, ignored, or rejected by the e-mail service, and the user will not see the message.

The threshold value for deciding whether the e-mail is valid and should be included in the list of e-mails for the e-mail resource for the user may be specified by the e-mail service provider, or the threshold value may be controlled by the user via preferences set by the user.

FIG. 15 is a diagram that illustrates a screen display containing the details of a mail list. FIG. 15 shows a web page 1500 that includes an object 1510 labeled "edit my list details". Among the preferences, or details, that the user may control via object 1510 is the threshold value for ignoring or accepting messages.

For example, object 1510 contains a text object 1520 labeled "Block SPAM Setting." Adjacent to text object 1520 are three button objects 1522, 1524, 1526 that correspond, respectively, to settings of "low", "medium," and "high." The user may select one of the three button objects 1522, 1524, 1526 to establish the desired setting. The e-mail service will accept or ignore messages based on whether the value for a message meets the corresponding value for the user specified setting.

Although the example shown in FIG. 15 has three relative settings, any number of settings may be provided to the user by the e-mail service, and the settings may be absolute in terms of the value scale used by the e-mail service (e.g., allowing the user to specify a percentage for the threshold value if a percentage scale or score is used).

By analyzing the e-mails received for each user, the e-mail service can identify messages that are invalid, or improper, for an e-mail resource or that are likely to be unwanted by the user, such as mass unsolicited e-mails. The analysis by the e-mail service is facilitated by the use of the unique addresses and the database of authorized senders, although as discussed above, other factors may be considered, such as the content of the messages.

VI. ADDITIONAL FUNCTIONS AND FEATURES OF AN E-MAIL SERVICE

An e-mail service may provide additional functions and features, including but not limited to the following: subscribing and unsubscribing to e-mail resources, using e-mail addresses that automatically expire, using a universal e-mail address to provide senders with a unique address, allowing e-mail resources to subscribe to a user, the anonymous sharing of user picks for e-mail resources, blocking hidden e-mail GIFs, allowing e-mail resources to "exchange subscribers" by directing users to related e-mail resources, and scoring the relevance of e-mails to determine whether a user will be interested in a particular message.

A. Subscribing to E-Mail Resources

As discussed above with referent to FIG. 4 and FIG. 14, a user may select an e-mail resource to which to subscribe and have the e-mail service provide the e-mail resource with user information from the user's desired user profile. For example, as shown in FIG. 14, the mail list may require that the user provide a first and last name to subscribe to the mail list, in which case the e-mail service provides the user with a subscription confirmation page, such as web page 1410. The user verifies the information to be sent to the e-mail resource as shown on web page 1410 and makes any changes that are necessary, such as selecting a different user profile or modifying specific information items before the user data is sent to the e-mail resource.

Some e-mail resources only require the subscriber to provide an e-mail address in order to subscribe instead of requiring additional information. According to another embodiment, the user subscribes to an e-mail resource using only one operation, selection, or click. For example, in FIG. 4, if the user wants to subscribe to a mail list 450, the user selects a subscribe object 460 that is associated with mail list 450. The e-mail service creates a unique address for the user and mail list 450 and provides the unique address to the mail list. If the e-mail resource only requires that an e-mail address be supplied to subscribe, the e-mail service provides the unique address directly to the e-mail resource without showing a subscription confirmation page to the user. In another embodiment, the option of reviewing a subscription confirmation page, even for an e-mail resource that only requires an e-mail address to subscribe, may be set by the user.

The single operation, single selection, or "one-click" subscription approach may also be used with an e-mail resource that requires additional user information to subscribe, because the e-mail service can retrieve the required user information from the user profile database. The user may have only one profile, or a default profile among a set of profiles, that the user wishes to be used when registering to e-mail resources. If the user does not want to review the information being submitted to a mail list via a subscription confirmation page, the user may select an option to bypass the normal subscription confirmation page, thereby allowing the user to subscribe via a single operation, a single selection, or a mouse click to an e-mail resource that requires other information in addition to an e-mail address.

Prior to deciding whether to subscribe to an e-mail resource, a user may review information about the e-mail resource. For example, in FIG. 4, user 180 selects a "learn more" object 440 to review the information stored at e-mail service 100 about mail list 410. Server 110 accesses e-mail resource database 170 to retrieve more information about mail list 410 and sender profile database 174 to retrieve information about the sender associated with mail list 410. E-mail service 100 presents the information retrieved thereby to user 180 via a web page.

FIG. 9 is a logical block diagram that illustrates the information about an e-mail resource. FIG. 9 shows a web page 900 that includes an "about list" object 910 that provides information about the resource itself that may be retrieved from e-mail resource database 170, such as the popularity of the e-mail resource, the language used for messages for the resource, and how frequently messages are sent. Web page 900 also includes an "about author" object 920 that provides information about the sender or author of the e-mail resource that may be retrieved from sender profile database 174, such as a home page associated with the author, a description of the e-mail resource provided by the author, and the popularity of the author. Web page 900 also includes a "sample e-mail" object 930 that provides copies of e-mails sent to the subscribers of the e-mail resource, which may be contained in e-mail resource database 170. The information provided in about list object 910, about author object 920, and sample e-mail object 930 allow a prospective subscriber to the e-mail resource to make a more informed judgment about whether the prospective subscriber wishes to sign-up for the e-mail resource.

B. Unsubscribing to E-Mail Resources

According to another embodiment, the user unsubscribes to one or more e-mail resources without affecting the user's subscriptions to any other e-mail resources. Because the e-mail service provides a unique e-mail address for each pairing of a user and an e-mail resource, the user's decision to unsubscribe to a particular e-mail resource has no impact on the user's subscriptions to any other e-mail resources. For example, in FIG. 6, an unsubscribe object 620 is provided to allow the user to unsubscribe to the corresponding e-mail resource. After a user unsubscribes to an e-mail resource, any messages sent to the user via the unique address associated with the e-mail service will be ignored or returned to the sender.

C. Auto-Expiring E-Mail Addresses

According to another embodiment, the user may specify that the subscription to an e-mail resource automatically expire after a certain period of time. For example, in FIG. 15, the user may specify that the subscription to the specified e-mail resource expire automatically by selecting an unsubscribe object 1540. The user may also specify the time period after which the subscription is to end, such as by using an input object 1542. For example, the user may want the subscription to automatically expire in 30 days.

After the expiration period has passed, the e-mail service unsubscribes the user from the list the on the date that the e-mail address expired. Setting a time after which the address expires may be used for one time transactions by the user, for services that expire after a set amount of time, or to monitor specific time-sensitive information.

D. Universal E-Mail Addresses

The unique addresses disclosed herein may be used with e-mail resources other than the e-mail resources offered for subscription through the e-mail service. According to one embodiment, the e-mail service monitors or filters the interactions between a user and an e-mail resource. The user provides a "universal" e-mail address in response to a request from an e-mail resource. As part of performing the filtering function for the interaction, the e-mail service identifies the universal e-mail address and creates and substitutes a unique address that is then sent to the e-mail resource. The filtering function may be provided in a number of ways, such as by using a browser companion tool or by using a proxy server associated with the e-mail service provider. By allowing the e-mail service provider to filter the user's interaction with other e-mail resources, the user may continue to benefit from the use of the unique addresses provided by the e-mail service for e-mail resources besides those offered for subscription by the e-mail service. As used herein, "universal e-mail address" refers to one e-mail address that established by the e-mail service to be used by the users of e-mail service 100 when the users provide an e-mail address to an e-mail resource.

Figure 10:
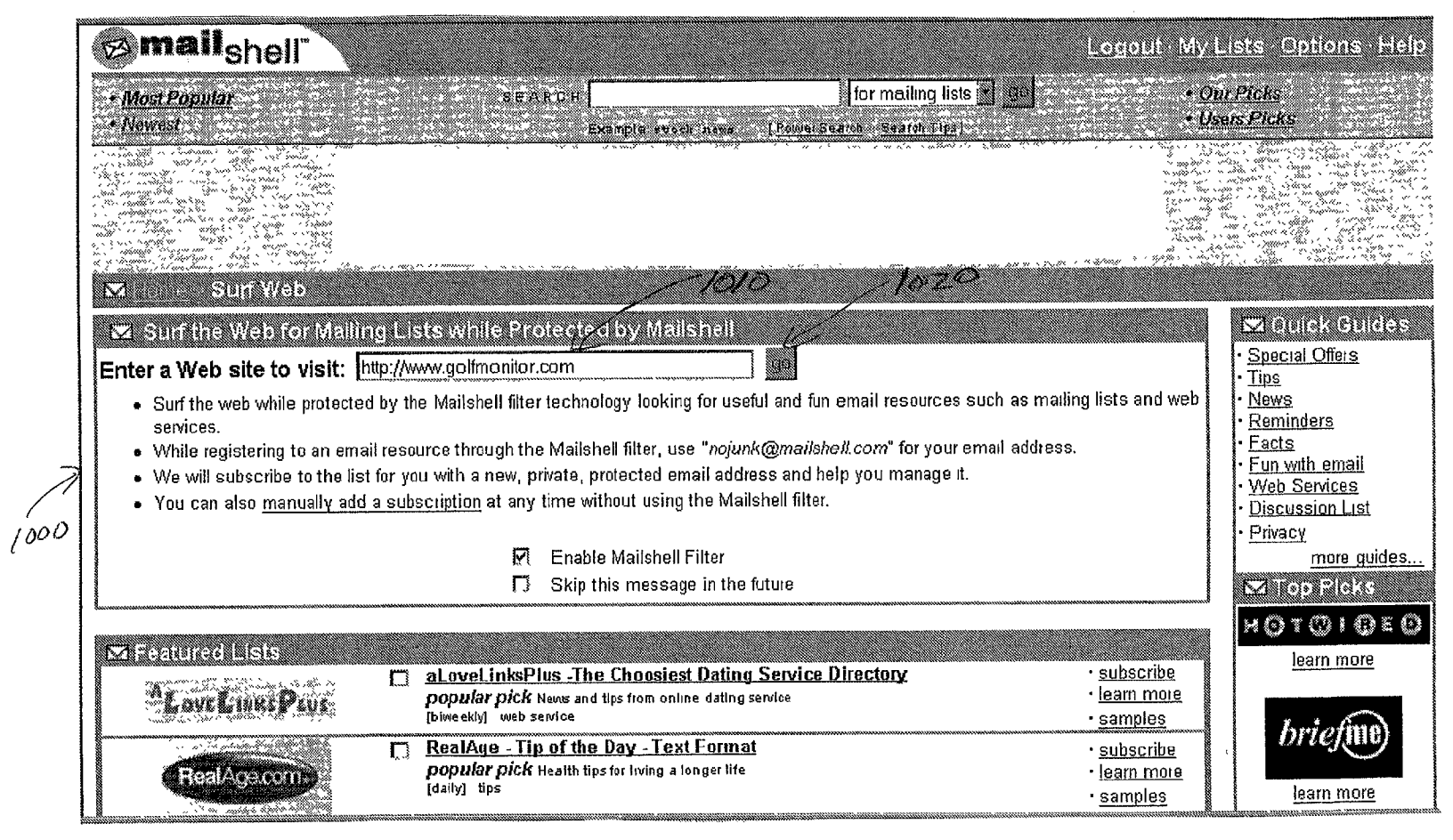

FIG. 10 is a diagram that illustrates a web page from an e-mail service that a user may use to visit another web page through a filter provided by the e-mail service. FIG. 10 illustrates a web page 1000 that is associated with an e-mail service. Web page 1000 includes an URL input object 1010 that the user may use to specify the URL for a web site that the user wishes to visit. After the user enters the URL for a web site in URL input object 1010, the user directs the e-mail service to take the user to the specified web page by selecting a "go" object 1020. The e-mail service retrieves the web page specified by the URL provided by the user and then provides the specified web page to the user by using the e-mail services filter.

Figure 11:
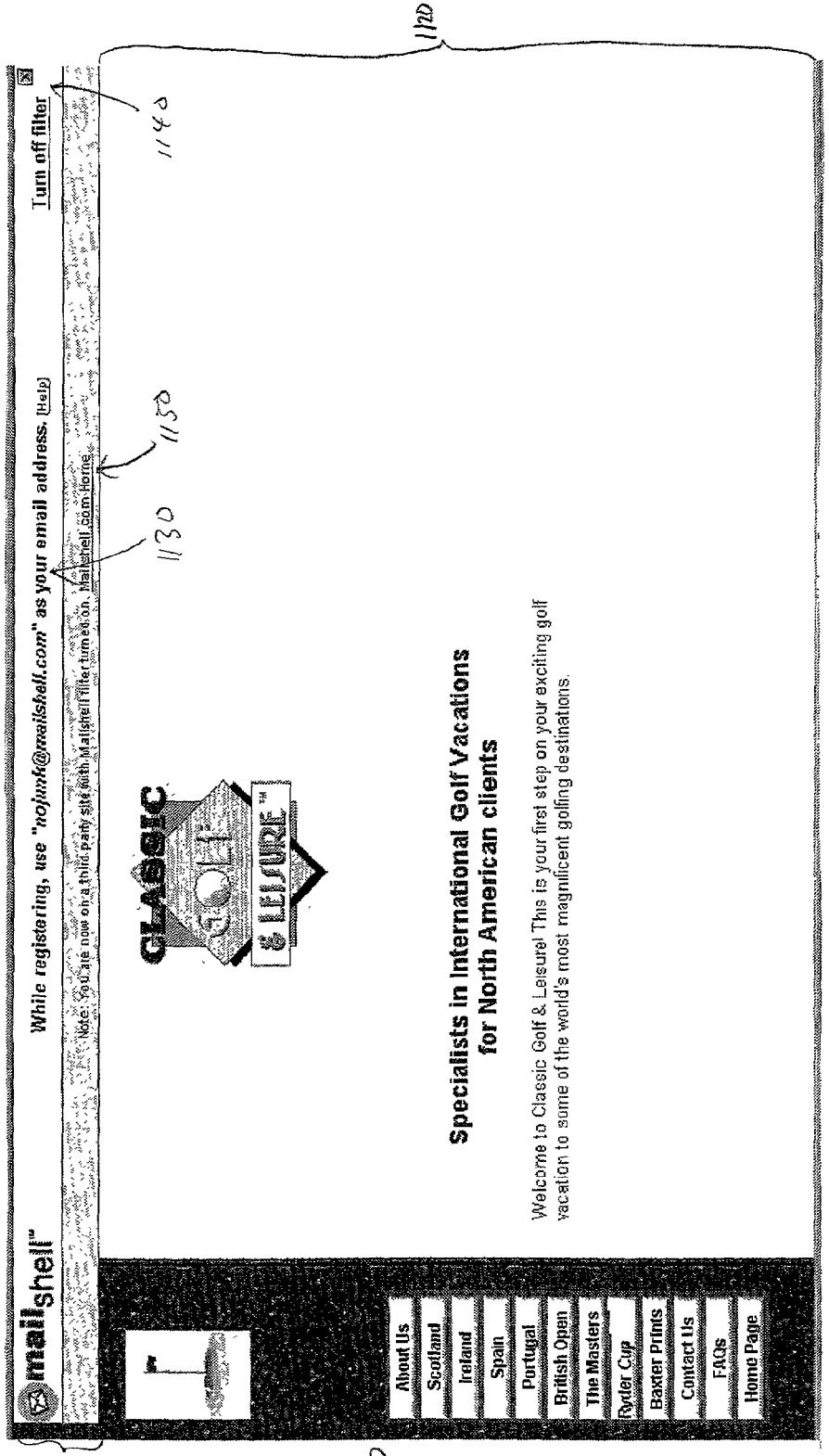
FIG. 11 is a diagram that illustrates a filtered web page.

FIG. 11 is a diagram that illustrates a filtered web page. FIG. 11 shows a filtered web page 1100 that includes a header object 1110 and content 1120. Content 1120 is the web page specified by the URL as provided by the server associated with that URL. Superimposed at the top of content 1120 is header object 1110 that is provided by the e-mail service, such as by using a browser companion tool or a proxy server. Header object 1110 includes several other objects, such as a message object 1130. The user may view a message contained in message object 1130, such as a reminder to use the universal e-mail address when the user registers with an e-mail address at filtered web page 1100. Other objects and features may also be included in header object 1110, such as another object for providing help or other assistance to the user.

Header object 1110 is not limited to the form of a horizontal banner at the top of filtered web page 1100. Header object 1110 may be displayed by the user's browser in any shape and at any location on the display window of the browser.

At some point while visiting a web site via filtered web pages, the user may be asked to provide an e-mail address, such as to subscribe to a newsletter or mailing list associated with the web site, carry out an e-commerce transaction, obtain documents or other information, etc. The user enters the universal e-mail address instead of the user's personal e-mail address. For example, as shown in the illustration of FIG. 11, the universal e-mail address may be "nojunk@mailshell.com" as shown in message object 1130 of header object 1110.

After the user enters the universal e-mail address on the filtered web page and submits the information to the web site (such as by selecting a "submit" button or perform a similar action), the information submitted by the user is intercepted by the e-mail service, such as by using a browser companion tool or a proxy server. The e-mail service inspects the information submitted by the user to the web site to identify the universal e-mail address provided by the user. The e-mail service replaces the universal e-mail address with a unique address that is generated for the particular user and particular e-mail resource.

Figure 12:
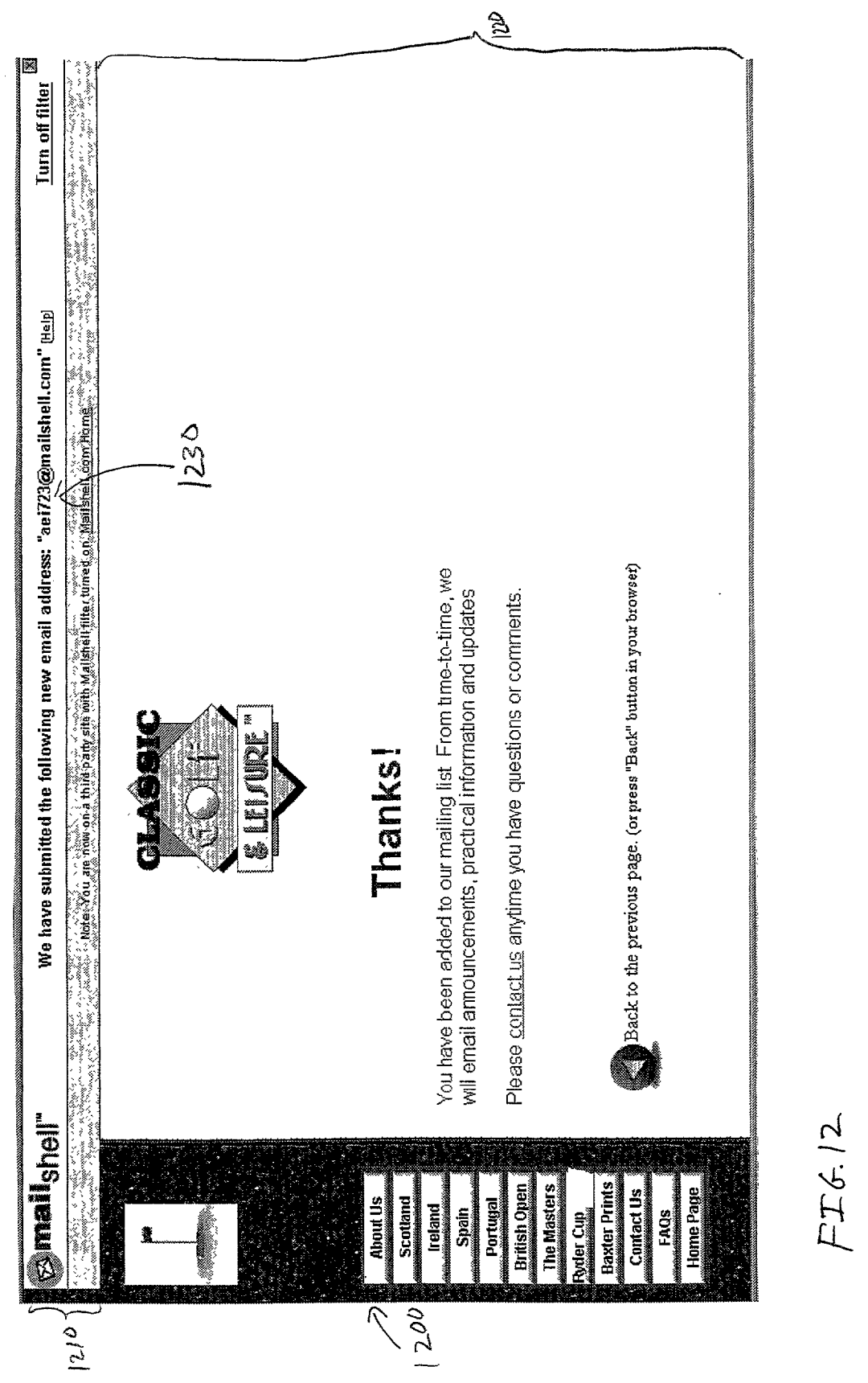

FIG. 12 is a diagram that illustrates a filtered web page after a universal e-mail address is used in conjunction with a web site. FIG. 12 shows a filtered web page 1200 that includes a header object 1210 and content 1220. Content 1220 is the web page specified by the URL as provided by the server associated with that URL. Superimposed at the top of content 1220 is header object 1210 that is provided by the e-mail service, such as by using a browser companion tool or a proxy server. Header object 1210 includes several other objects, such as a message object 1230. Message object 1230 shows a message that a new e-mail address has been submitted to the server associated with filtered web page 1200, and message object 1230 may also show the unique address created by the e-mail service.

In the example illustrated in FIG. 10 through FIG. 12, the web site need not have any connection to or knowledge of the e-mail service provider or be aware that the web pages provided by the web site to the user are being filtered by an e-mail service. By filtering the web pages for the web site, the e-mail service identifies when the user provides the universal e-mail address and substitutes a unique address in place of the universal address before the e-mail address requested by the web site is sent to the web site. As a result, the e-mail service can control future delivery of unwanted e-mails to the user from the web site. In addition, the filtering process may be used to help protect the user's privacy by preventing a web site from placing cookies on the user's computer.

The use of a filter to visit web pages is not required to use a universal e-mail address provided by an e-mail service. In another embodiment, a user provides the universal e-mail address to e-mail resources with whom the e-mail service has established a procedure for using the e-mail service's universal e-mail address. For example, the web site may be configured to recognize a specified e-mail address, such as "nojunk@mailshell.com", as a universal e-mail address associated with the e-mail service provider. Upon recognizing the universal address, the web site sends a request to the e-mail service provider to supply a login page for the user to log into the e-mail service. After the login, the e-mail service creates a unique address that is associated with the user and the web site. The e-mail service then returns the user to the web site and also provides the web site with the unique address to be used by the web site in place of the universal e-mail address entered by the user.

E. E-Mail Resources Subscribing to a User

While the examples above have been described in the context of a user providing a unique address via the e-mail service to e-mail resources, such as a mail list, web site, or other similar entity, the unique addresses provided by the e-mail service are not limited to contexts in which the user takes the initiative to establish the unique address between the user and the other party.

According to one embodiment, an e-mail resource may subscribe to the user and thereby obtain a unique address for that e-mail resource and the user. For example, the user may provide other e-mail resources, also referred to herein as subscribing parties, with both a universal (or subscription) e-mail address and a user identifier corresponding to the user, such as might be provided on a business card. The subscription e-mail address is associated with the e-service provider, and the user identifier is a unique name or label associated that the e-mail service associates with the user.

The subscribing party may subscribe to the user by sending an e-mail to the subscription e-mail address. The receipt of the subscribing party's e-mail may prompt the e-mail service to provide the subscribing party with a URL for a subscription web page via a reply e-mail. The subscription web page includes a user subscription form. The receipt of the subscribing e-mail may prompt the e-mail service to provide the subscribing party with an HTML e-mail that includes the subscription form. The subscribing party may also receive the subscription web page directly by providing the appropriate URL for the subscription page to the subscribing party's browser.

Once the subscribing party accesses the subscription form, the subscribing party selects the user to whom the subscribing party wishes to subscribe. For example, the subscribing party may provide the user identifier that the user provided to the subscribing party. In response to submitting the subscription form, the e-mail service generates a unique address (as discussed above) for the user and the subscribing party, and the e-mail service provides the unique address to the subscribing party. The e-mail service establishes another group or folder, similar to those for the other e-mail resources described above, for the user with the e-mail service for messages sent to the unique address associated with the subscribing party.

The user to whom to subscribing party has subscribed may manage the unique address associated with the subscribing party just like the other e-mail resources discussed above. For example, if the user wishes to unsubscribe to the subscribing party, the user need only unsubscribe to the appropriate group or folder with the e-mail service.

In another embodiment, the e-mail service conducts a survey with the subscribing party in order to determine how likely the user will want to receive messages from the subscribing party. The survey may be included in the subscription form provided to the subscribing party. For example, the e-mail service may include questions on the subscription form that ask the subscribing party to provide information about the user. The requested information may be data that is contained in one of the user profiles for the user, such as the identifier for the user discussed above, or other information about the user, such as the user's full name, address, phone number, and birth date. The user may configure the information that the mail service includes in the survey.

Depending on the familiarity of the subscribing party with the user, the subscribing party may not know some or all of the information asked about in the survey by the e-mail service. Subscribing parties that know little about the user are more likely to send unwanted messages to the user.

For example, the subscription e-mail address and the user identifier may fall into the hands of other parties, such as direct marketers, who know nothing else about the user and thus won't be able to respond correctly to the survey questions. Furthermore, other parties who receive the subscription e-mail address and the user identifier may not even take the time to subscribe to the user, which helps to reduce the unwanted e-mails sent to the user.

Subscribing parties that know more about the user, such as friends and relatives, are more likely to send messages that the user wants to receive and are more likely to be able to respond correctly to the survey. The results of the survey may be represented in a final value or score as calculated according to a set of rules that may be established by either the e-mail service or the user.

The survey may also require the subscribing party to perform an action, such as by selecting a red dot on a graphical image. Including such an action in the survey may help prevent web "robots" from being able to subscribe to a user since a web robot may not be able to identify and select the desired spot on the graphical image. The ability of the subscribing party to perform the requested action may be another factor to be considered in the final value or score for the survey.

A threshold value for allowing a subscribing party to successfully subscribe to the user may be established by either the e-mail service or the user. If the subscribing party fails to reach the threshold score, the subscribing party will not be provided with an e-mail address for the user. If the subscribing party meets or exceeds the threshold score, then the e-mail service generates a unique address for the user and the subscribing party, and the e-mail service provides the e-mail address to the subscribing party. The results of the survey may also be provided to the user for a manual decision by the user about whether to allow the subscribing party to subscribe to the user.

The user may manage the group or folder associated with the subscribing party in a similar fashion to the groups or folders for other e-mail resources. For example, the user may unsubscribe to the subscribing party to prevent receiving future e-mails from the subscribing party.

F. Sharing User Picks Anonymously

According to another embodiment, the users of the e-mail service may rate each e-mail resource and anonymously share the ratings with other users. For example, in FIG. 15, web page 1500 includes a set of rating objects 1560. The user may specify a rating by selecting on one of the specific ratings provided. For example, in the set of rating objects 1560, the user may choose not to provide a rating, or to provide a numerical rating from 1 to 5.

FIG. 16 is a diagram that illustrates a web page that includes a selection of user picks. FIG. 16 shows a web page 1600 that includes user names 1610, 1612, 1614. Web page 1600 also includes user picks names 1620, 1622, 1624 that correspond to user names 1610, 1612, 1614, respectively.

Each "user picks name" is associated with a collection of e-mail resource, such as mail lists, that the user has rated and included together under the specified "user picks name." For example, in FIG. 16, user name 1610 is associated with the user identifier, or label, "Baseball Purist" and the corresponding user picks name 1620 is associated with the collection of mail lists called "2000 Top Baseball Teams."

If a user selects the object associated with user picks name 1620, the e-mail service provides the collection of mail lists associated with user picks name 1620. A user may create more than one user picks listing that are associated with a particular user identifier.

FIG. 17 is a diagram that illustrates a web page that includes a collection of e-mail resources associated with a user picks listing. FIG. 17 includes a web page 1700 that lists mail lists 1710, 1712, 1714. Web page 1700 also includes a user picks information object 1720 that provides information about the user picks.

Users of the e-mail service may create one or more user picks listings and share the listings anonymously with other users. The user specifies a user name, or user label, that is associated with the user, but that does not identify the true identity of the user. The user may specify whether the list is to be public or private. A public users picks list is viewable by any user on the e-mail service, while a private users picks list is only available to others by the user sending others a URL corresponding to the user's picks list.

The user may also establish a profile associated with the user label to provide additional information that the user decides to reveal about themselves or provide in relation to their views or recommendations. For example, if the user picks list relates to stock investments, the user may provide some general information about the user's background concerning their ability to provide useful stock advice or the purpose of the particular list of e-mail resources, such as investments relating to a particular technology sector.

Other users may view the user picks provided by the user. The e-mail service may allow other users of the e-mail service to provide a rating of the user supplying a user picks listing, thereby establishing a reputation of the user who supplies the listings. The reputation established for a user is associated with the user label that the user has chosen and is independent of the e-mail resources to which the user has subscribed.

Other users may review the reputation and the profile supplied by the user for the user label when deciding whether to view a user picks listing of a particular user or in deciding what weight, if any, to give any information provided by the user.

Because the reputation is associated with the user label and not with any particular e-mail resources, the user's reputation may follow the user around as the user visits other e-mail resources. Other users may access the user's reputation and the profile for the user label, if the user has supplied a profile, via the e-mail service.

G. Blocking Hidden E-Mail GIFs

Sometimes senders of HTML e-mails include links to graphical images that are in the graphics interchange format (GIF). Such images are often referred to as GIFs. The GIFs may be transparent, meaning that when displayed in the HTML e-mail, nothing is displayed. A transparent GIF is an image that has a certain bit set on one of the GIF's colormap entries, so that a Web browser's background will show through wherever that color appears in the image background. Transparent GIFs are often referred to as "hidden images."

Hidden images may have a legitimate use, such as to position other elements and objects in the document being displayed. Hidden images may also be used for more questionable uses, such as retrieving information about a user without the user being aware that information is being retrieved or to whom the information is being sent. The use of a hidden image to retrieve user information typically also involves the user of a "cookie."

Cookies are generally simple text files that store information at a client, such as a user's computer, instead of storing the information at a server. The cookie is set at the client based on a request from the web server to the browser running on the client. Because the cookies is associated with a particular web site, each time the user visits the particular web site, the browser running on the client sends the cookie for the particular web site with its stored information to the web server for the web site.

Some web servers use hidden images to set cookies at the user's computer to collect information about the user. Because the GIF is transparent, the user may be unaware that a GIF is included in the e-mail or that a cookie has been set at the user's machine to be used to retrieve information about the user for sending to another party.

For example, a cookie may be set on the user's computer whenever an object, such as a transparent GIF, is retrieved from a web server specified by the link for the GIF. When a user visits a web page that is served from a web server, cookies may be set at the client when the web page is retrieved from the server. In contrast, when a user receives an HTML e-mail, the message is retrieved from a mail server, not a web server and therefore the web server cannot set a cookie at the client. However, by including a transparent GIF in the HTML e-mail, the client will send a request to the web server for the transparent GIF, which allows the web server to know the IP address of the client, gather data passed by the client such as the client being used and the operating system, and instruct the client to set a cookie at the client computer.

The cookie that is set at the client as a result of the transparent GIF in an HTML e-mail may be used to track the user's computer and provide the information to a web server, such as the web sites visited by the user. When the web server instructs the client's browser to set the cookie, the web server can specify the information to be included in the cookie from the information accessible by the browser. Whenever the client browser requests an object (e.g., another hidden image or other object in the HTML e-mail) from a server that is specified in the cookie, the contents of the cookie are sent to the specified server.

According to another embodiment, the e-mail service blocks hidden GIFs in the e-mails that the e-mail service receives for users. For example, when an HTML e-mail message is received for a user at the e-mail service, the e-mail service analyzes the message to identify if any GIFs are included. For example, if the HTML e-mail contains any GIFs, the e-mail service loads the e-mail, including the GIF, to see if all the pixels in any of the GIFs are specified to be transparent. If a transparent GIF is identified, then the e-mail service can block the transparent GIF by not loading the transparent image, thereby precluding the setting of a cookie at the user's computer and the ability of another part to acquire information about the user via the cookie.

H. Subscriber Exchange

According to another embodiment, the e-mail service allows authors of e-mail resources to barter user registrations. If an author signs up a user for the author's e-mail resource, the author may present a selection of other e-mail resources to the user. For example, the author may choose to offer other e-mail resources available from the e-mail service relating to the same topic as the author's mail list, or the author may choose to offer e-mail resources on unrelated topics that the author believes may be of interest to users that subscribe to the author's e-mail resource.

If the user chooses to subscribe to one of the e-mail resources offered by an author, the author informs the e-mail service that the user wants to subscribe to the selected e-mail resource. The e-mail service subscribes the user to the chosen resource using a unique address, which can be performed easily because the e-mail service has just accessed the user profile and may have the user information still available for use. The user may be allowed to choose not to see the subscription confirmation page when subscribing to e-mail resources offered by another e-mail resources.

According to another embodiment, the e-mail resource may elect to follow a "single opt in" procedure. A single opt in approach means that the user "opts in" to the subscription by sending the subscription request via the e-mail service. In contrast, a "double opt in" approach involves both the subscription request by the user and a subsequent user confirmation. The confirmation typically is an action taken by the user, such as replying to an e-mail message sent by the e-mail resource. The double opt in approach is often used to ensure that the user whose address is provided in the subscription request wants to give out their e-mail address to subscribe, as compared to another party signing up the user without the user's knowledge.

Because the user is subscribing via the e-mail service, the author of the e-mail resource has less concern that another party is subscribing the user without the user's knowledge because the user has already established their identity and expressed a willingness to subscribe by logging into the e-mail service. By using the single opt in approach, the e-mail resource avoids the drop off often seen among users between the subscription request and the follow-up action for the double opt in approach, which results in a large reduction in the number of successful subscriptions.

According to yet another embodiment, the e-mail service tracks the offering of e-mail resources by authors and the resulting subscriptions from the offerings. The information collected may be used by the e-mail service to allow an author of an e-mail resource to pay a fee to the author that directed the user to the selected resource. E-mail resource authors may also provide fee information to other authors to help the other authors decide which e-mail resources to offer to users, and the authors may negotiate among each other what fee should apply for driving subscribers to the other e-mail resources. The fees may be in the form of credits that are tracked by the e-mail service, and the credits may be specified to have a cash value for payments between authors of the e-mail resources.

VII. HARDWARE OVERVIEW

Figure 18:
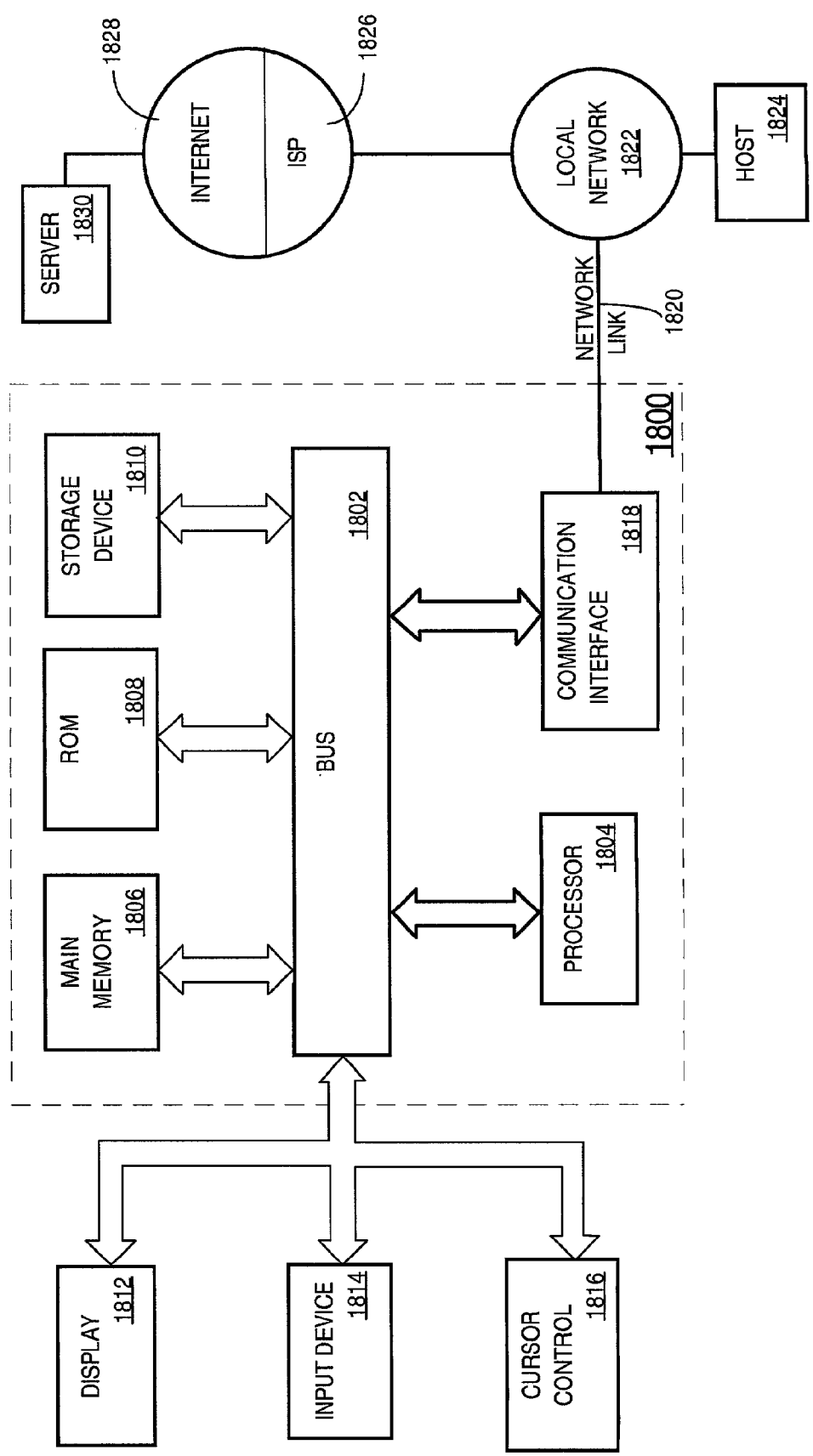
FIG. 18 is a block diagram that illustrates a computer system upon which an embodiment may be implemented.

FIG. 18 is a block diagram that illustrates a computer system 1800 upon which an embodiment of the invention may be implemented. Computer system 1800 includes a bus 1802 or other communication mechanism for communicating information, and a processor 1804 coupled with bus 1802 for processing information. Computer system 1800 also includes a main memory 1806, such as a random access memory (RAM) or other dynamic storage device, coupled to bus 1802 for storing information and instructions to be executed by processor 1804. Main memory 1806 also may be used for storing temporary variables or other intermediate information during execution of instructions to be executed by processor 1804. Computer system 1800 further includes a read only memory (ROM) 1808 or other static storage device coupled to bus 1802 for storing static information and instructions for processor 1804. A storage device 1810, such as a magnetic disk or optical disk, is provided and coupled to bus 1802 for storing information and instructions.

Computer system 1800 may be coupled via bus 1802 to a display 1812, such as a cathode ray tube (CRT), for displaying information to a computer user. An input device 1814, including alphanumeric and other keys, is coupled to bus 1802 for communicating information and command selections to processor 1804. Another type of user input device is cursor control 1816, such as a mouse, a trackball, or cursor direction keys for communicating direction information and command selections to processor 1804 and for controlling cursor movement on display 1812. This input device typically has two degrees of freedom in two axes, a first axis (e.g., x) and a second axis (e.g., y), that allows the device to specify positions in a plane.

The invention is related to the use of computer system 1800 for implementing the techniques described herein. According to one embodiment of the invention, those techniques are performed by computer system 1800 in response to processor 1804 executing one or more sequences of one or more instructions contained in main memory 1806. Such instructions may be read into main memory 1806 from another computer-readable medium, such as storage device 1810. Execution of the sequences of instructions contained in main memory 1806 causes processor 1804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1804 for execution. Such a medium may take many forms, including but not limited to, non-volatile media, volatile media, and transmission media. Non-volatile media includes, for example, optical or magnetic disks, such as storage device 1810. Volatile media includes dynamic memory, such as main memory 1806. Transmission media includes coaxial cables, copper wire and fiber optics, including the wires that comprise bus 1802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1804 for execution. For example, the instructions may initially be carried on a magnetic disk of a remote computer. The remote computer can load the instructions into its dynamic memory and send the instructions over a telephone line using a modem. A modem local to computer system 1800 can receive the data on the telephone line and use an infra-red transmitter to convert the data to an infra-red signal. An infra-red detector can receive the data carried in the infra-red signal and appropriate circuitry can place the data on bus 1802. Bus 1802 carries the data to main memory 1806, from which processor 1804 retrieves and executes the instructions. The instructions received by main memory 1806 may optionally be stored on storage device 1810 either before or after execution by processor 1804.

Computer system 1800 also includes a communication interface 1818 coupled to bus 1802. Communication interface 1818 provides a two-way data communication coupling to a network link 1820 that is connected to a local network 1822. For example, communication interface 1818 may be an integrated services digital network (ISDN) card or a modem to provide a data communication connection to a corresponding type of telephone line. As another example, communication interface 1818 may be a local area network (LAN) card to provide a data communication connection to a compatible LAN. Wireless links may also be implemented. In any such implementation, communication interface 1818 sends and receives electrical, electromagnetic or optical signals that carry digital data streams representing various types of information.

Network link 1820 typically provides data communication through one or more networks to other data devices. For example, network link 1820 may provide a connection through local network 1822 to a host computer 1824 or to data equipment operated by an Internet Service Provider (ISP) 1826. ISP 1826 in turn provides data communication services through the world wide packet data communication network now commonly referred to as the "Internet" 1828. Local network 1822 and Internet 1828 both use electrical, electromagnetic or optical signals that carry digital data streams. The signals through the various networks and the signals on network link 1820 and through communication interface 1818, which carry the digital data to and from computer system 1800, are exemplary forms of carrier waves transporting the information.

Computer system 1800 can send messages and receive data, including program code, through the network(s), network link 1820 and communication interface 1818. In the Internet example, a server 1830 might transmit a requested code for an application program through Internet 1828, ISP 1826, local network 1822 and communication interface 1818.

The received code may be executed by processor 1804 as it is received, and/or stored in storage device 1810, or other non-volatile storage for later execution. In this manner, computer system 1800 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for using a computer-implemented intermediary to provide a replacement address, the method comprising the computer-implemented steps of:
   receiving, at a first web page provided by the intermediary, a request from a user to navigate to a second web page provided by other than the intermediary;
   displaying at least a portion of the second web page along with information provided by the intermediary;
   identifying a first address entered by a user into the displayed second web page; and
   sending, from the intermediary in response to the identifying the first address, the replacement address in order to subscribe the user to an e-mail resource by using the replacement address.

2. The method of claim 1, further comprising the computer-implemented steps of:
   generating a plurality of additional replacement addresses, wherein each of the plurality of additional replacement addresses is associated with one of a plurality of e-mail resources at the second web page.

3. The method of claim 2, wherein information provided by the intermediary is displayed in a header at the top of a page display, wherein at least a portion of the second web page is displayed below the header.

4. The method of claim 3, wherein the first address is displayed in the header.

5. The method of claim 4, wherein the header further includes instructions for entering the email address.

6. The method of claim 1, further comprising:
   receiving a plurality of electronic messages sent to the second address;
   identifying whether each of the plurality of electronic messages is an unwanted electronic message; and
   ignoring each of the plurality of electronic messages that is identified as said unwanted electronic message.

7. The method of claim 6, wherein each of the plurality of electronic messages includes contents, and wherein the step of identifying whether each of the plurality of electronic messages is said unwanted electronic message is based on the contents of each of the plurality of electronic messages.

8. The method of claim 7, wherein the step of identifying whether each of the plurality of electronic messages is said unwanted electronic message comprises the computer-implemented steps of:
   determining whether the electronic message contains a hidden image; and
   identifying said each of the plurality of electronic messages as said unwanted electronic message when the electronic message contains said hidden image.

9. The method of claim 6, wherein each of the plurality of electronic messages includes a sending address, and wherein the step of identifying whether each of the plurality of electronic messages is said unwanted electronic message comprises the computer-implemented steps of:
   determining whether the sending address is included in a list of authorized sending addresses; and
   identifying said each of the plurality of electronic messages as said unwanted electronic message when the sending address is not included in the list of authorized sending addresses.

10. The method of claim 1, wherein upon identifying the first address a log in request is provided to the user.

11. The method of claim 10, wherein the second address is created after a user login.

12. The method of claim 1, further comprising the computer-implemented steps of:
   preventing a cookie from the second web page from being stored on a computer operated by the user.

13. An apparatus for using a computer-implemented intermediary to provide a replacement address, the apparatus comprising:
   a processor;
   a machine-readable medium including one or more instructions executable by the processor for performing the following:
   receiving, at a first web page provided by the intermediary, a request from a user to navigate to a second web page provided by other than the intermediary;
   displaying at least a portion of the second web page along with information provided by the intermediary;
   identifying a first address entered by a user into the displayed second web page; and
   sending, from the intermediary in response to the request identifying the first address, a replacement address used to subscribe the user to an e-mail resource at the second web page.

14. A machine-readable storage medium including instructions executable by a processor for using a computer-implemented intermediary to provide a replacement address, the machine readable medium comprising one or more instructions for:
   receiving, at a first web page provided by the intermediary, a request from a user to navigate to a second web page provided by other than the intermediary;
   displaying at least a portion of the second web page along with information provided by the intermediary;
   identifying a first address entered by a user into the displayed second web page; and
   sending, from the intermediary in response to the request identifying the first address, a replacement address used to subscribe the user to an e-mail resource at the second web page.

* * * * *